United States Patent
Kono et al.

(10) Patent No.: US 9,015,435 B2
(45) Date of Patent: Apr. 21, 2015

(54) STORAGE MANAGEMENT SYSTEM AND STORAGE MANAGEMENT METHOD

(71) Applicant: Hitachi, Ltd., Tokyo (JP)

(72) Inventors: Misako Kono, Yokohama (JP);
Nobuhiro Maki, Yokohama (JP);
Masayasu Asano, Yokohama (JP);
Junichi Hara, Sagamahira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/512,664

(22) Filed: Oct. 13, 2014

(65) Prior Publication Data

US 2015/0032983 A1 Jan. 29, 2015

Related U.S. Application Data

(63) Continuation of application No. 13/384,960, filed as application No. PCT/JP2011/064419 on Jun. 23, 2011, now Pat. No. 8,886,903.

(51) Int. Cl.
*G06F 12/00* (2006.01)
*G06F 3/06* (2006.01)
*G06F 11/14* (2006.01)

(52) U.S. Cl.
CPC .......... *G06F 3/0619* (2013.01); *G06F 11/1448* (2013.01); *G06F 11/1458* (2013.01); *G06F 11/1461* (2013.01); *G06F 2201/815* (2013.01); *G06F 3/065* (2013.01); *G06F 3/067* (2013.01)

(58) Field of Classification Search
USPC ................................................. 711/154, 162
See application file for complete search history.

(56) References Cited

U.S. PATENT DOCUMENTS

| | | | |
|---|---|---|---|
| 7,120,769 B2 | 10/2006 | Yagawa et al. | |
| 2004/0172512 A1* | 9/2004 | Nakanishi et al. | ............ 711/162 |
| 2006/0206675 A1 | 9/2006 | Sato et al. | |
| 2007/0244938 A1 | 10/2007 | Michael et al. | |
| 2009/0150626 A1 | 6/2009 | Benhase et al. | |

(Continued)

FOREIGN PATENT DOCUMENTS

| | | |
|---|---|---|
| EP | 2 172 842 A1 | 4/2010 |
| EP | 2 309 372 A2 | 4/2011 |

(Continued)

OTHER PUBLICATIONS

PCT International Search Report and Written Opinion on application No. PCT/JP2011/064419 dated Jul. 19, 2011; 6 pages.

(Continued)

*Primary Examiner* — John Lane
(74) *Attorney, Agent, or Firm* — Foley & Lardner LLP

(57) ABSTRACT

An embodiment of this invention is a storage management system including a processor and a storage device to manage a storage system having one or more copy functions. The processor locates data designated to determine a backup method. The storage device stores copy function management information on the one or more copy functions of the storage system. The processor refers to the copy function management information to ascertain the unit of copy operation of each of the one or more copy functions. The processor determines a candidate for a copy function of the storage system to be used to back up the designated data depending on the data configuration in a volume holding the designated data and the unit of copy operation of the candidate for the copy function.

20 Claims, 18 Drawing Sheets

(56) References Cited

U.S. PATENT DOCUMENTS

| | | |
|---|---|---|
| 2010/0082925 A1 | 4/2010 | Irisawa et al. |
| 2011/0082988 A1 | 4/2011 | Kono et al. |
| 2011/0119458 A1 | 5/2011 | Matsuzaki et al. |

FOREIGN PATENT DOCUMENTS

| | | |
|---|---|---|
| JP | 2008-033585 | 2/2008 |
| JP | 2009-533777 | 9/2009 |

OTHER PUBLICATIONS

Vmware Virtual Machine File System: Technical Overview and Best Practices, Version 1.0; Jul. 25, 2007; pp. 1-19; Paper No. WP-022-PRD-01-01.

European Patent Office extended search report on application 11868067.7 mailed Feb. 18, 2015; 6 pages.

* cited by examiner

CONFIGURATION INFORMATION TABLE 407

| HOST ID 501 | VM ID 502 | DRIVE ID 503 | VM IMAGE FILE ID 504 | DATA STORE ID 505 | HOST VOLUME ID 506 | STORAGE ID 507 | VIRTUAL VOLUME ID 508 |
|---|---|---|---|---|---|---|---|
| HOST001 | VM001 | C | IMG001 | DS001 | H-VOL001 | ST001 | V-VOL001 |
|  | VM001 | D | IMG001 | DS001 | H-VOL001 | ST001 | V-VOL001 |
|  | VM002 | C | IMG002 | DS002 | H-VOL002 | ST001 | V-VOL002 |
|  | VM002 | D | IMG003 | DS002 | H-VOL003 | ST001 | V-VOL003 |
|  |  |  |  |  | H-VOL002 | ST001 | V-VOL002 |
|  |  |  |  |  | H-VOL003 | ST001 | V-VOL003 |
| ... | ... | ... | ... | ... | ... | ... | ... |

*Fig. 5*

DATA STORAGE AREA MANAGEMENT TABLE 408

| VM/DRIVE ID 601 | HOST VOLUME ID 602 | HOST VOLUME LBA AREA 603 | STORAGE ID 604 | POOL ID 605 | VIRTUAL VOLUME ID 606 | VIRTUAL VOLUME LBA AREA 607 | PHYSICAL RESOURCE ID 608 | PHYSICAL RESOURCE LBA AREA 609 |
|---|---|---|---|---|---|---|---|---|
| VM001-C | HVOL001 | LBA0000-0999 | ST001 | POOL 001 | VVOL001 | LBA0000-0999 | MEDIA 001 | LBA0000-0999 |
|  | HVOL001 | LBA1000-1999 |  |  | VVOL001 | LBA1000-1999 |  | LBA1000-1999 |
|  | N/A | N/A |  |  | N/A | LBA2000-2999 |  | N/A |
| VM001-D | HVOL001 | LBA3000-3999 |  |  | VVOL001 | LBA0000-0999 |  | LBA3000-3999 |
|  | N/A | N/A |  |  | N/A | LBA1000-1999 |  | N/A |
|  | ... | ... |  | ... | ... | ... | ... | ... |
|  | HVOL002 | LBA0000-0999 |  | POOL 002 | VVOL002 | LBA0000-0999 | MEDIA 003 | LBA0000-0999 |
|  | HVOL002 | LBA1000-1999 |  |  | VVOL002 | LBA1000-1999 |  | LBA1000-1999 |
| VM002-D | HVOL002 | LBA2000-2999 |  |  | VVOL002 | LBA2000-2999 |  | LBA2000-2999 |
|  | HVOL003 | LBA0000-0999 |  |  | VVOL003 | LBA3000-3999 | MEDIA 002 | LBA0000-0999 |
|  | ... | ... | ... | ... | ... | ... | ... | ... |

*Fig.6*

COPY FUNCTION MANAGEMENT TABLE 409

| EQUIPMENT CATEGORY 701 | SYSTEM EQUIPMENT ID 702 | COPY FUNCTION 703 | USE 704/705 | | PRIORITY LEVEL 706 |
| --- | --- | --- | --- | --- | --- |
| | | | BACKUP | RELOCATION | |
| VIRTUAL MACHINE | VM001 | DATA COPY FUNCTION | N/A | O | 6 |
| HOST | HOST001 | VM SNAPSHOT FUNCTION | O | N/A | 4 |
| | HOST001 | IN-DATA-STORE IMAGE FILE REARRANGEMENT FUNCTION | N/A | O | 4 |
| | HOST001 | DATA-STORE-TO-DATA-STORE IMAGE FILE RELOCATION FUNCTION | N/A | O | 5 |
| STORAGE | ST001 ST002 | COPY FUNCTION WITH VOLUME DESIGNATION (FOR CLONE) | O | O | 1 |
| | ST001 | COPY FUNCTION WITH VOLUME DESIGNATION (FOR SNAPSHOT) | O | N/A | 1 |
| | ST001 | COPY FUNCTION WITH FILE DESIGNATION (FOR CLONE) | O | O | 2 |
| | ST001 | COPY FUNCTION WITH FILE DESIGNATION (FOR SNAPSHOT) | O | N/A | 2 |
| | ST001 | COPY FUNCTION WITH LBA DESIGNATION (FOR CLONE) | O | O | 3 |
| | ST001 | COPY FUNCTION WITH LBA DESIGNATION (FOR SNAPSHOT) | O | | 3 |
| ... | ... | ... | ... | | |

Fig. 7

BACKUP MANAGEMENT TABLE 410

| BACKUP ID 801 | BACKUP TARGET ID 802 | COPY TYPE 803 | SCHEDULE 804 | P-VOL ID 805 | S-VOL ID 806 |
|---|---|---|---|---|---|
| BK001 | VM001 | VOLUME LEVEL COPY FUNCTION (FULL COPY) | AT 23:00 EVERYDAY | V-VOL001 | V-VOL101 |
| BK002 | VM002-C | VOLUME LEVEL COPY FUNCTION (DIFFERENTIAL COPY) | EVERY 1 HOUR | V-VOL002 | V-VOL102 |
|  |  |  |  | V-VOL003 | V-VOL103 |
| ... | ... | ... | ... | ... | ... |

| 901 SYSTEM POLICY TABLE | 902 |
|---|---|
| ITEM | VALUE |
| NUMBER OF DATA STORES PER HOST COMPUTER | MAX10 |
| NUMBER OF IMAGE FILES PER DATA STORE | MAX100 |
| NUMBER OF HOST VOLUMES PER DATA STORE | 1-5 |
| NUMBER OF DRIVES PER IMAGE FILE | 1 |
| BACKUP WINDOW FOR BK002 | 5 MIN. |
| ... | ... |

*Fig.9*

STORAGE MANAGEMENT SYSTEM AND STORAGE MANAGEMENT METHOD

CROSS-REFERENCE TO RELATED PATENT APPLICATIONS

This application is a Continuation of U.S. application Ser. No. 13/384,960, now U.S. Pat. No. 8,886,903 (National Stage of PCT/JP2011/064419), filed Jan. 19, 2012, incorporated herein by reference in its entirety.

BACKGROUND

This invention relates to a storage management system and a storage management method and, in particular, relates to management of copy functions of a storage system.

Recent widespread growth of IT technology has brought explosive increase in IT equipment including host computers. As a result, the abundance of IT equipment has produced a problem of difficulty in management of IT equipment. In such a circumstance, server virtualization techniques have been known as techniques that can achieve easy management of host computers.

A typical server virtualization technique is disclosed in *VMware Virtual Machine File System: Technical Overview and Best Practices* (Non-Patent Literature 1). This technique allows a virtualization control program (called hypervisor) to run on a host computer, so that the hypervisor constructs virtual computers (also called virtual machines (VMs)) different from the host computer in configuration, number and performance capability.

In this technique, the hypervisor manages a plurality of volumes to provide them for a single data storage area (called data store). In a meanwhile, in an environment that utilizes the server virtualization technique (called server virtualization environment), an OS (guest OS) running on a VM, and application programs and data therefore are unified into one or more image files (also called VM image files) of data.

A VM image file is stored in a data store and managed by the hypervisor. The VM image file is stored in a storage area in a storage system. The VM image file does not need to have a data structure of files managed by the file system.

In the meanwhile, there exist copy techniques by storage systems that replicate data in case of data loss. For example, U.S. Pat. No. 7,120,769 (Patent Literature 1) discloses that a storage system connected to a host computer simultaneously replicates volumes together in which data for application programs running on the host computer are stored using a copy function of the storage system.

This technique can restore the data for the application programs from both of a logical failure in an application program and a physical failure such as a fault in a drive in the storage system. Moreover, in the backup technique of a storage system, the storage system performs data copy required for backup; the load on the host computer can be suppressed. This technique achieves backups of a plurality of VMs without degradation in performance of the host computer (virtual servers).

Patent Literature 1 U.S. Pat. No. 7,120,769
Non-Patent Literature 1 *VMware Virtual Machine File System: Technical Overview and Best Practices*, VMware, Inc.

SUMMARY

In an environment in which a virtual server uses an external storage system, the copy function of a storage system may not be able to answer a request for definite backup in units of drive or application program (and the data therefore) on the guest OS because information on a VM is gathered in a VM image file.

In such a case, data are copied in units of volume, which means that data unnecessary for the copy are copied. Copying unnecessary data leads to degradation in capacity efficiency and lowered security. To solve this problem, it might be necessary that volume configuration and data arrangement in each VM and the storage system be grasped to be changed.

In adding a VM to a host computer, the same problem arises unless its backup method (a backup function to be used) is considered to determine the volume configuration and the data arrangement. To solve this problem, it is necessary to preliminarily set up a volume configuration and data arrangement that satisfy the backup requirements of the VM.

In a server virtualization environment, however, various volume configurations are available; employable backup methods are different depending on the existing functions and the volume configuration. For this reason, it is difficult for a user to select a function and to determine how to use the function in order to implement an appropriate backup method. The same problem may occur to a computer system in an environment different from the server virtualization environment.

An aspect of this invention is a storage management system for managing a storage system having one or more copy functions, comprising a processor and a storage device. The processor locates data designated to determine a backup method. The storage device stores copy function management information on the one or more copy functions of the storage system. The processor refers to the copy function management information to ascertain the unit of copy operation of each of the one or more copy functions. The processor determines a candidate for a copy function of the storage system to be used to back up the designated data depending on data configuration in a volume holding the designated data and the unit of copy operation of the candidate for the copy function.

An aspect of this invention provides an appropriate backup method depending on the backup target data.

BRIEF DESCRIPTION OF THE DRAWINGS

FIG. 5 is a drawing exemplifying a configuration information table in the first embodiment;

FIG. 6 is a drawing exemplifying a data storage area management table in the first embodiment;

FIG. 7 is a drawing exemplifying a copy unction management table in the first embodiment;

FIG. 8 is a drawing exemplifying a backup management table in the first embodiment;

FIG. 9 is a drawing exemplifying a system policy table in the first embodiment;

DETAILED DESCRIPTION OF THE PREFERRED EMBODIMENTS

Hereinafter, preferred embodiments of this invention will be described with reference to the accompanying drawings. For clarity of explanation, the following descriptions and the accompanying drawings contain omissions and simplifications as appropriate. Throughout the drawings, like components are denoted by like reference signs and their repetitive explanation is omitted for clarity of explanation, if not necessary.

First Embodiment

A first embodiment of this invention is described. The first embodiment explains management of a computer system including a host computer, a storage system, and a management system. The management system in the first embodiment determines a candidate for the method of backing up designated data (such as a logical disk in a virtual machine). To suppress the load on the host computer, it is preferable that the backup use a copy function of the storage system only without using a copy function of the host computer. Moreover, in terms of capacity efficiency and security, it is preferable that data other than the backup target data be removed from the data which are copied in the backup.

The management system ascertains volume configuration in the storage space which is provided by the storage system and is used by the host computer and arrangement of stored data under the volume configuration. The management system further ascertains the specifications of the copy functions implemented in the storage system. In particular, it ascertains the unit of copy operation (such as volume or file) in each copy function.

The management system selects a copy function in the storage system that can back up only the backup target data in backing up the designated data. If current data arrangement does not allow any copy function (unit of copy operation) implemented in the storage system to copy the backup target data only, the management system determines a method of relocating data to achieve such copy. Under a configuration after the data relocation, any one of the copy functions of the storage system can copy only the specific backup target data.

In this way, the first embodiment can determine a method of backup at small granularity (such as logical drive level or application level) using a copy function of the storage system. Specific processing to determine the backup method is hidden to a user.

Figure 1:
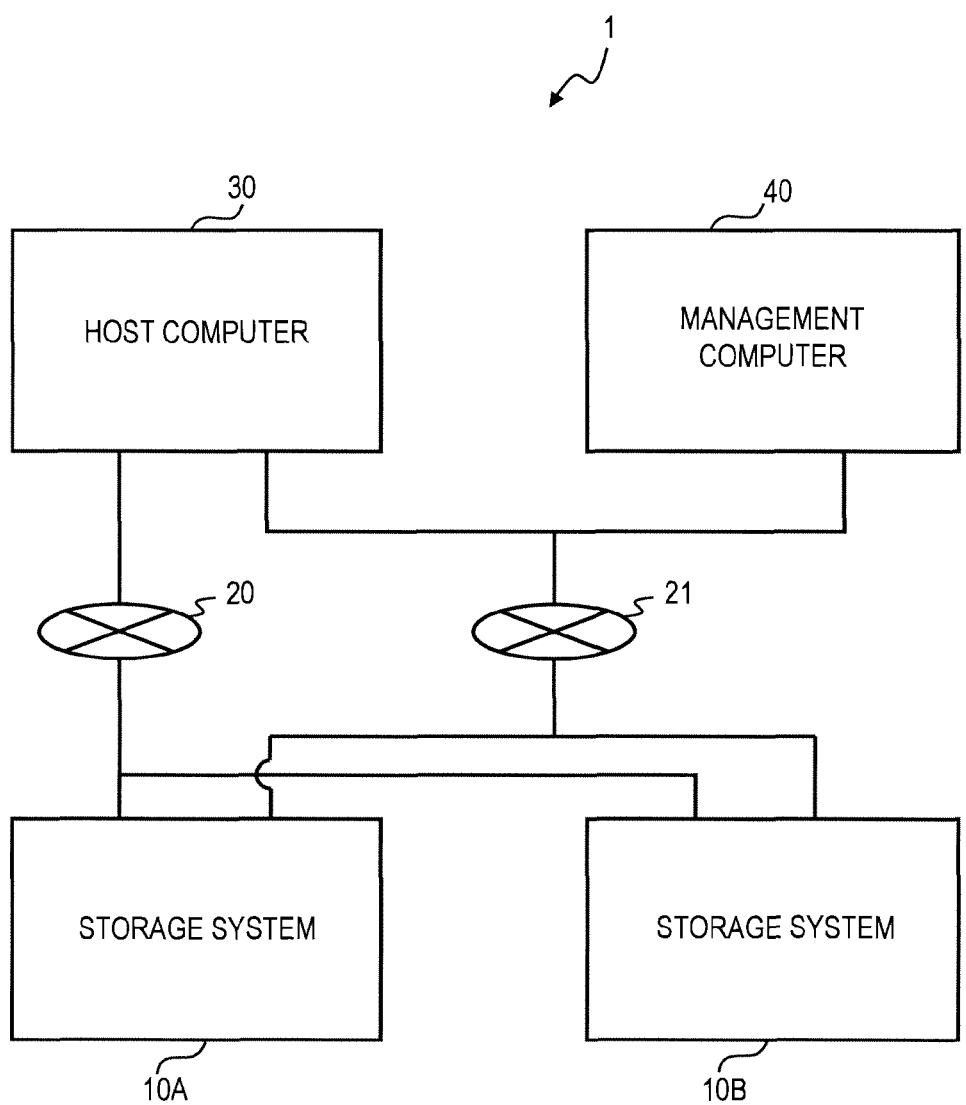
FIG. 1 is a block diagram illustrating an example of the configuration of a computer system in the first embodiment.

With reference to FIG. 1 to FIG. 4, a configuration of a computer system 1 in the first embodiment is described. FIG. 1 is a block diagram schematically illustrating a configuration of the computer system 1 in the first embodiment. As shown in FIG. 1, the computer system 1 includes storage systems 10A and 10B, a host computer 30, and a management computer 40; these are connected via a data network 20 and a management network 21 to one another.

The storage systems 10A and 10B and the host computer 30 are connected to one another via the data network 20, from their own data interfaces. For example, the data network 20 is a SAN (Storage Area Network). The data network 20 may be an IP network or any other kind of network for data communication.

The storage systems 10A and 10B, the host computer 30, and the management computer 40 are also connected to one another via the management network 21, from their own management interfaces. For example, the management network 21 is an IP network. The management network 21 may be a SAN or any other kind of network. The data network 20 and the management network 21 may be the same network.

The host computer 30 and the management computer 40 may be computers having the same hardware configuration. The computer system 1 in FIG. 1 includes two storage systems 10A and 10B, and one host computer 30, and one management computer 40, but the numbers of computers and storage systems included in the computer system 1 are not limited. In the following description, a storage system 10 means arbitrary one of the storage systems 10A and 10B. In this example, these storage systems have the same configuration.

Figure 2:
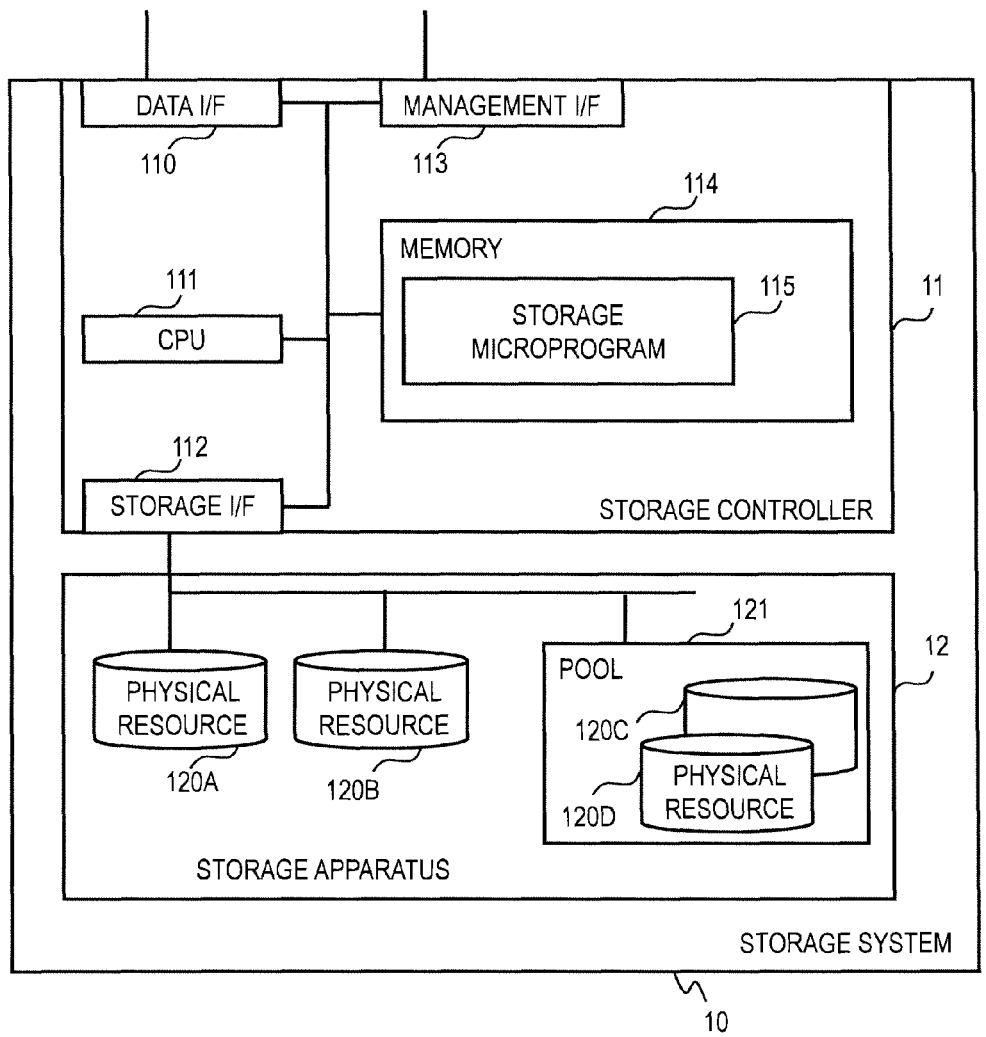
FIG. 2 is a drawing illustrating an example of the configuration of a storage system in the first embodiment.

FIG. 2 is a diagram schematically illustrating a configuration of a storage system 10 in the first embodiment. The storage system 10 includes a storage controller 11 for controlling the overall storage system 10 and a storage apparatus 12 for storing data. The storage controller 11 and the storage apparatus 12 are connected via a storage I/F (interface) 112.

The storage controller 11 includes a data I/F 110, a CPU (Central Processing Unit) 111, a storage I/F 112, a management I/F 113, and a memory 114. The data I/F 110 is an interface for the data network 20 and has one or more communication ports. The storage controller 11 transmits and receives data to and from the host computer 30 through a port.

The CPU 111 is a processor for executing a program stored in the memory 114 of a primary storage device. The storage I/F 112 is an interface for the storage apparatus 12. The storage controller 11 transmits and receives data or a control command to and from the storage apparatus 12 through the storage I/F. It should be noted that at least a part of the functions of the storage controller 11 described in this embodiment may be implemented by hardware.

The management I/F 113 is an interface for the management network 21 and has one or more communication ports. The storage controller 11 transmits and receives data or a control command to and from the host computer 30, the management computer 40, or the other storage system through these ports.

The memory 114 holds a storage microprogram 115. The storage microprogram 115 is a program for managing the storage system 10 and is executed by the CPU 111. For convenience of explanation, the storage microprogram 115 is shown in the memory 114, but typically, the storage microprogram 115 and data used thereby are loaded to a storage area in the memory 114 from a storage area of the storage apparatus 12 or a storage area of any other non-volatile storage device.

The storage microprogram 115 has a function to allow the host computer 30 to recognize volumes. For example, the storage microprogram 115 provides the host computer 30 with physical storage areas of the storage apparatus 12 via the I/Fs to be regarded as one or more volumes. The example of FIG. 2 exemplifies four physical resources 120A to 120D.

FIG. 2 shows four physical resources 120A to 120D, but a storage system 10 may have an arbitrary number of physical resources. In the following description, a physical resource 120 means an arbitrary one of the physical resources 120A to 120D.

A physical resource 120 is a real storage volume for storing data to be used by the host computer 30. The physical resource 120 represents a physical storage area provided by a physical device such as an HDD (Hard Disk Drive) or an SSD (Solid State Drive). For example, the physical resource 120 is a physical storage area of a RAID (Redundant Array of Independent Disks) configured with a plurality of data storage drives.

The storage microprogram 115 in this example configures a pool 121 including a plurality of logical volumes. In the example of FIG. 2, a pool includes two physical resources 120C and 120D. The physical resources 120C and 120D provide a plurality of logical volumes.

In the pool 121, each logical volume is separated into a plurality of pages. The storage microprogram 115 manages the pool 121 in units of page. The storage microprogram 115 configures a virtual volume from the pool 121 to provide it to the host computer 30. This will be described later.

The storage microprogram 115 has a function to copy data in a logical volume to another logical volume in accordance with the setting data. For example, in the case where the physical resources 120A and 120B in the storage system 10 each provide one logical volume, the storage microprogram 115 copies data in the physical resource 120A to the physical resource 1203. The storage microprogram 115 also has a function to copy a virtual volume.

The unit (copy granularity) in which the storage controller 11 can copy data depends on the design (function) of the storage controller 11. The units of copy operation of the storage controller 11 are, for example, a volume, a file, a page, a block, and the like. A block level copy operation copies a range specified by an LBA. The storage controller 11 implements one or more copy functions different in the unit of copy operation. The system in this embodiment determines a backup method depending on the unit of copy operation that the storage controller 11 (storage system 10) can support. This will be described later.

Figure 3:
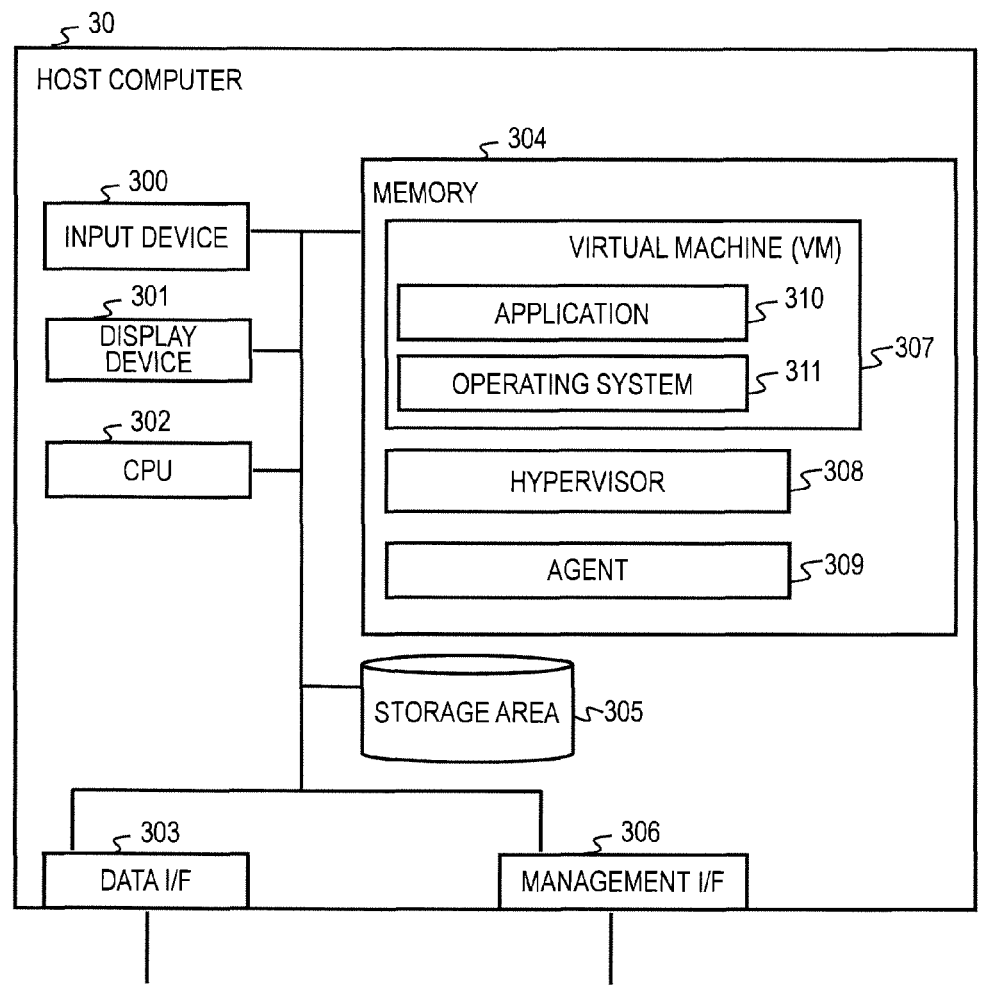
FIG. 3 is a drawing illustrating an example of the configuration of a host computer in the first embodiment.

FIG. 3 is a block diagram schematically illustrating a configuration of the host computer 30 in the first embodiment. The host computer 30 includes an input device 300, a display device 301, a CPU 302, a data I/F 303, a memory 304, a non-volatile storage area 305 of a secondary storage device, and a management I/F 306.

Typical examples of the input device 300 are a keyboard and a pointer device, but the input device 300 may be a device different from these. The display device 301 typically is an LCD (Liquid Crystal Display). The user operates the host computer 30 with these input and output devices.

The CPU 302 is a processor for executing a program stored in the memory 304. The data I/F 303 is an interface for the data network 20 and having one or more communication ports. The host computer 30 transmits and receives data to and from the storage systems 10A and 10B through these ports.

The memory 304 is a primary storage device; in FIG. 3, the memory 304 holds a VM (Virtual Machine) 307, a hypervisor 308, and an agent 309. In the VM 307, an application 310 and an OS (Operating System) 311 work. These programs are executed by the CPU 302.

For convenience of explanation, programs and data used thereby are shown in the memory 304, but typically, the programs and the data used thereby are loaded from a storage area 305 in the secondary storage device to a storage area in the memory 304. The memory 304 and the storage area 305 can be regarded as one storage device. The storage area 305 of the secondary storage device has a non-transitory storage medium for storing programs and data necessary to implement predetermined functions. The secondary storage device may be an external storage device connected via a network.

The application 310 is a program which runs on the VM 307 to execute jobs. It reads or writes data from or to a physical resource 120 in a storage system 10 to perform its processing. FIG. 3 exemplifies one application 310 but a plurality of applications may run on the VM 307. The application 310 is, for example, groupware/an e-mail server program or a database management system. A storage system 10 provides the application program 310 with one or more volumes.

The OS 311 is basic software running on the VM 307 in the host computer 30 to manage the overall computer. This is called guest OS. The hypervisor 308 is a virtualization control program for configuring and controlling the VM 307. The hypervisor 308 allows one or more VMs 307 to run on the memory 304. The function to copy or relocate a VM image file of the VM 307 is included in the hypervisor 308.

The agent 309 has functions to obtain information on the host computer 30, the VM 307, the application 310, and the guest OS 311 and information on the storage systems 10A and 10B and to inform the management computer 40 of the information. The management I/F 306 is an interface for the management network 21; it transmits and receives data and control commands to and from the storage systems 10A and 10B, and the management computer 40 for system management.

Figure 4:
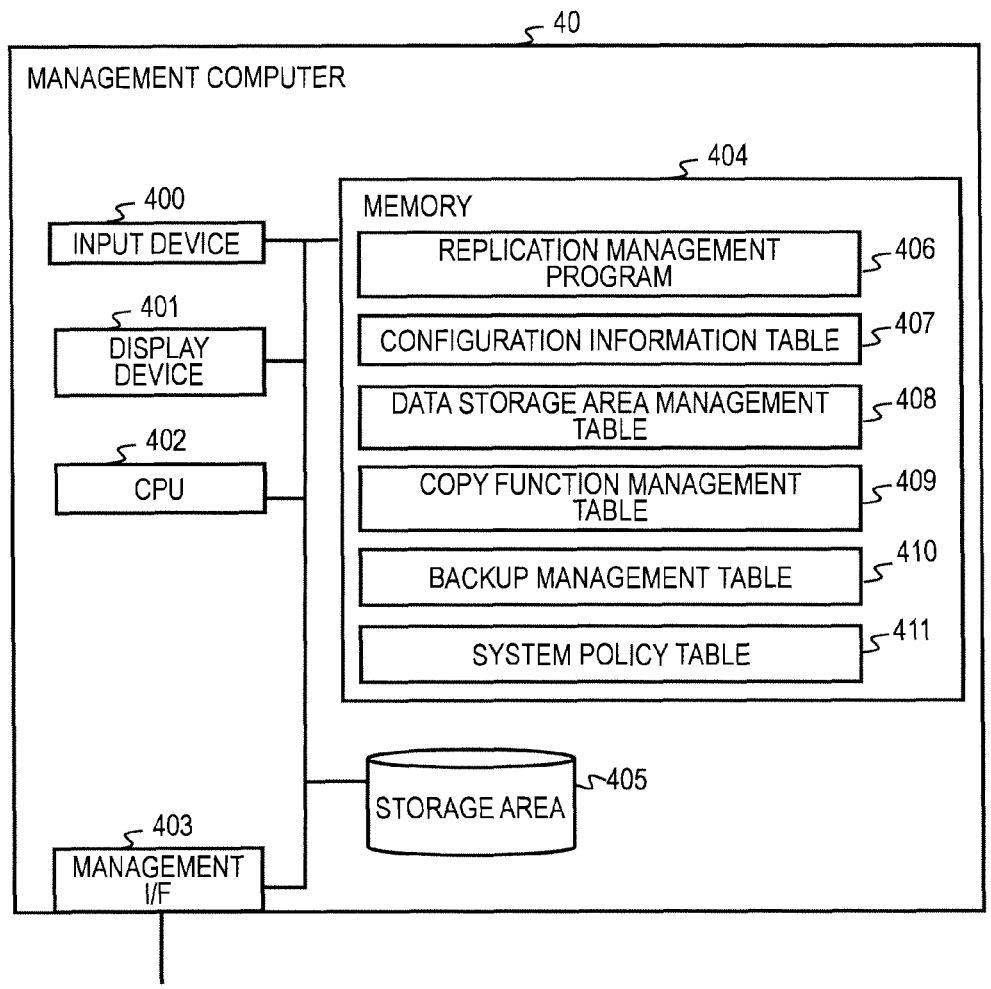
FIG. 4 is a drawing illustrating an example of the configuration of a management computer in the first embodiment.

FIG. 4 is a block diagram schematically illustrating the management computer 40 in the first embodiment. The management computer 40 includes an input device 400, a display device 401, a CPU 402, a management I/F 403, a memory 404, and a storage area 405. Typical examples of the input device 400 are a keyboard and a pointer device, but the input device 400 may be a device different from these. The display device 401 typically is an LCD.

The administrator (user) inputs necessary data with the input device 400 while checking results of processing by sight with the display device 401. The information inputted by the administrator and an example shown by the display device 401 will be described later. In the computer system 1 in FIG. 1, the management system is configured with one management computer 40, but the management system may include a management console that provides a user interface, in addition to the management computer 40.

The management console includes a display device and an input device. The administrator accesses the management computer 40 from the management console and instructs the management computer 40 to perform processing. Furthermore, the administrator obtains the result of processing of the management computer 40 to show it at the management console. The management system may include a plurality of computers each having a part or all of the functions of the management computer 40.

The CPU 402 is a processor for executing a program stored in the memory 404. The management I/F 403 is an interface for the management network 21; it transmits and receives data and control commands to and from the host computer 30 and the storage systems 10A and 10B for system management.

In this example, the memory 404 holds a replication management program 406, a configuration information table 407, a data storage area management table 408, a copy function management table 409, a backup management table 410, and a system policy table 411.

For convenience of explanation, the program and the tables are shown in the memory 404, but typically, the program and the tables are loaded from the storage area 405 of the secondary storage device to a storage area in the memory 404. These can be regarded as one storage device. The secondary storage device is a storage device having a non-transitory storage medium. The secondary storage device may be an external storage device connected via a network.

The replication management program 406 is implemented by being executed by the CPU 402 to perform processing in this embodiment. The replication management program 406 provides the administrator with a setting window, obtains information from the host computer 30 and the storage systems 10A and 10B, determines a backup method, proposes a backup method, controls copy functions, and manages tables.

The configuration information table 407, the data storage area management table 407, the copy function management table 409, the backup management table 410, and the system policy table 411 will be described later. In preferred embodiments of this invention, information (data) used by the management system is stored in the foregoing tables. The information held in data storage areas to be used in this embodiment does not depend on data structure but may be expressed in any data structure. For example, a data structure appropriately selected from table, list, database, and queue can store the information.

In the computer system 1, a program is executed by a processor to perform predetermined processing while using storage devices and communication interfaces. Accordingly, the explanations in this embodiment having the subjects of "program", such as the replication management program 406, may be replaced with those having the subjects of "processor (CPU)". The processing executed by a program is processing performed by the apparatus or the system on which the program is running.

A processor operates in accordance with a program to function as an operation part for implementing a predetermined function. For example, the CPU 402 operates in accordance with the replication management program 406 to function as the manager of the computer system. The same applies to the other programs, processors and apparatuses. Apparatuses and systems including processors and programs are the apparatuses and systems including these operation parts.

Now described are the tables referred to in this embodiment. FIG. 5 shows an example of the configuration information table 407. Each entry in the configuration information table 407 stores information in relationship to information in each column (field). The configuration information table 407 is a table for storing information on logical configuration (volume configuration and file configuration) of the host computer 30 and the storage systems 10A and 10B. The configuration information table 407 is referred to by the replication management program 406 executed in the management computer 40.

The configuration information table 407 stores configuration information on volumes and VMs (including image files thereof). Specifically, the configuration information table 407 stores a host ID 501 for identifying the host computer 30, VM IDs 502 for identifying VMs in the host computers 30, drive IDs 503 for identifying logical drives recognized by the guest OSs in the VMs, and VM image file IDs 504 for identifying VM image files of the VMs.

The configuration information table 407 further stores data store IDs 505 for identifying data stores, host volume IDs 506 for identifying host volumes, storage IDs 507 for identifying storage systems 10, and virtual volume IDs 508 for identifying virtual volumes.

The replication management program 406 obtains information on the host ID 501, the VM IDs 502, the drive IDs 503, the VM image file IDs 504, the data store IDs 505, and the host volume IDs 508 from the agent 309 of the host computer 30. The replication management program 406 obtains information on the storage IDs 507 and the virtual volume IDs 506 from the storage microprograms 115 of the storage systems 10A and 10B.

The replication management program 406 stores obtained information in the configuration information table 407. The administrator may preliminarily input necessary information to the configuration information table 407. The configuration information table 407 may store the identifiers of applications running on the guest OS in the column of the drive IDs 503, which are the identifiers of the information on logical drives. The entries including the identifiers of applications should have the same fields as the entries of the logical drives. It should be noted that, in this description, identifiers, names, and IDs may be used as identification information for identifying objects; they are replaceable with one another.

FIG. 6 shows an example of the data storage area management table 408. The data storage area management table 408 is a mapping table for locating the physical storage areas of logical drives for the guest OSs. Each entry in the data storage area management table 408 stores information in relationship to information in each column (field). This table is referred to by the replication management program 406 executed by the management computer 40.

The data storage area management 408 includes VM/drive IDs 601 for identifying logical drives and VMs therein, host volume IDs 602 for identifying host volumes, and host volume LBA (Logical Block Address) areas 603 for indicating areas in the host volumes which hold data written to the VMs/drives.

The data storage area management table 408 further includes storage IDs 604 for identifying storage systems 10, pool IDs 605 for identifying pools 121 configured in the storage systems 10, and virtual volume IDs 606 for identifying virtual volumes.

The data storage area management table 408 still further includes virtual volume LBA areas 607 for indicating storage areas in the virtual volumes corresponding to the host volume LBA areas 603, physical resource IDs 608 for identifying physical resources 120, and physical resource LBA areas 609 for indicating storage areas in the physical resources corresponding to the virtual volume LBA areas 607.

The replication management program 406 obtains information on the storage IDs 604, the pool IDs 605, the virtual volume IDs 606, the virtual volume LBA areas 607, the physical resource IDs 608, the physical resource LBA areas 609 from the storage systems 10A and 10B. A storage ID 604, a pool ID 605, a physical resource ID 608 are determined when a physical resource 120 is added to a storage system 10.

The replication management program 406 obtains the VM/drive IDs 601, the host volume IDs 602, the host volume LBA areas 603 from the agent 309 of the host computer 30. A VM/drive ID 601, a host volume ID 602, a host volume LBA area 603, a virtual volume ID 606, a virtual volume LBA area 607, and a physical resource LBA area 609 are determined when data for a VM/drive is stored.

In other words, the virtual volume LBA area 607 and the physical resource LBA area 609 are determined when a write from the host computer 30 causes a request for page allocation to a virtual volume. The virtual volume ID 606 may be determined at creation of a virtual volume.

For example, the configuration information table 407 and the data storage area management table 408 indicate that the data in a drive D of a virtual machine VM001 is held in an area LBA 3000 to 3999 in a physical resource MEDIA001 in a storage system ST001. The host computer 30 recognizes that the data in the drive D in the virtual machine VM001 is in the LBA 3000 to 3999 in the host volume HVOL001, but actually, the data is held in a storage area in a physical resource.

In the data storage area management table 408, the column of VM/drive IDs 601 of identifiers of information on logical drives may store the identifiers of applications running on the guest OSs. An entry including the identifier of an application has the same fields as an entry of a logical drive.

The configuration information table 407 of FIG. 5 and the data storage area management table 408 of FIG. 6 are merely examples; the data storage area management table 408 may have any structure as far as the table teaches what LBA area in the storage area holds actual written data of a backup target (such as a VM or a logical drive). These examples include entries of virtual volumes only, but the tables may indicate logical volumes other than the virtual volumes.

FIG. 7 exemplifies the copy function management table 409. The copy function management table 409 is a table for managing information on copy functions of each piece of equipment in the computer system 1. Each entry in the copy function management table 409 stores information in relationship to information in each column (field). The copy function management table 409 is referred to by the replication management program 406 executed in the management computer 40.

The copy function management table 409 contains equipment categories 701 for indicating the categories of equipment, system equipment IDs 702 for identifying equipment, copy functions 703 owned by the equipment, availability for backup use 704 and relocation use 705 for the copy functions 703, and priority levels 706 for using the copy functions.

In this example, the equipment categories 701 include virtual machine, host computer, and storage system. The column of copy functions 703 shows copy functions such as "copy function with volume designation (for clone)" and "copy function with LEA designation (for snapshot)" by way of example, but any expression may be acceptable as long as the copy function can be identified. The clone means a full copy and the snapshot means a differential copy.

As shown in FIG. 7, some copy functions may be used for either one of backup and relocation only, and some copy functions may be used for the both of them. Copy functions that can be implemented in equipment are not limited to these copy functions.

The priority levels 706 indicate priority levels of the copy functions of the equipment used in backups. A smaller value indicates a higher priority. To suppress the load on the host computer 30, copy functions of a storage system 10 have higher priorities than those of the host computer 30 (including virtual machines). Also, copy functions faster in copy speed have higher priorities because a backup preferably takes shorter time.

If a plurality of copy functions are available for a backup, the replication management program 406 selects the copy function that has the highest priority as the copy function to be used. Alternatively, in presenting the administrator backup candidates, the replication management program 406 may display those having higher priority levels 706 or calculate the priorities of the backup candidates from the priority levels 706 to show them.

An equipment category 701, a system equipment ID 702, a copy function 703, and uses 704 and 705 are provided by the replication management program 406 when system equipment is installed or a copy function is added. The administrator may input them.

The replication management program 406 may preliminarily have the relationships between the individual functions 703 and the uses 704 and 705; otherwise, it may automatically relate them from the specification information of the copy functions. The copy function management table 409 does not need to include the priority levels 706; otherwise, the replication management program 406 does not need to assign the values. The replication management program 406 may obtain the information on the priority levels 706 from the administrator and store them; otherwise, the administrator may determine default values.

FIG. 8 exemplifies the backup management table 410. The backup management table 410 is a table for managing setting information for backups. Each entry in the backup management table 410 stores information in relationship to information in each column (field). The backup management table 410 is referred to by the replication management program 406 executed in the management computer 40.

The backup management table 410 contains backup IDs 801 for identifying backup processes, backup target IDs 802 for identifying targets of the backups, copy types 803 to be used in the backups, schedules 804 of the backups, P-VOL IDs 805 for identifying primary volumes holding data of the backup targets, and S-VOL IDs 806 for identifying secondary volumes of backup destinations. One or more backup target IDs 802 are associated with one backup ID 801.

In response to an input from the administrator that requests a backup of a specific target, the replication management program 406 stores information on a backup target ID 802, a copy type 803, a schedule 804, and a P-VOL ID 805 in the backup management table 410. A backup ID 801 is assigned at setting by the administrator.

The replication management program 406 identifies a virtual volume ID 508 by referring to the configuration information table 407 with the information on the backup target 802 specified by the administrator and stores the value in the P-VOL ID 805. The administrator may directly set the P-VOL ID 805 of the primary volume of a data volume or may specify the P-VOL ID using other information that can identify the data volume.

An S-VOL ID 806 may be set by the administrator; otherwise, the replication management program 406 may find an unused volume with reference to the configuration information table 407 to set the ID of the volume. In the example of FIG. 8, a schedule 804 determines the start time of a backup and is specified by time (for example, "at 23:00 on each day") or a time interval (for example, "every 1 hour"), but any manner of specification may be accepted as far as it determines the time to start the backup. In general, backup for data protection is carried out periodically in this manner.

As described above, it is preferable to use a copy function of a storage system 10 in a backup in order to prevent increase in load on the host computer 30. Both of the two copy types exemplified in FIG. 8 are copy functions of the storage system 10: the copy function with volume designation (for clone) and the copy function with volume designation (for snapshot).

FIG. 9 exemplifies a system policy table 411. The system policy table 411 is a table for managing conditions of the logical configuration (such as volume configuration and file configuration) of the computer system 1 and backups. The system policy table 411 contains items of policy 901 and values thereof 902. The replication management program 406 may store the values of information obtained from the administrator in the columns of items 901 and values 902; otherwise, default values may be predetermined.

In the example of FIG. 9, the maximum number of data stores in a host computer is 10 and the maximum number of image files in a data store is 100. A backup window is a time period which can be used for a backup.

In this embodiment, the replication management program 406 may propose to change or automatically change the logical configuration (file and volume configurations and data arrangement) for a backup. The replication management program 406 refers to the system policy table 411 and proposes or carries out such change in the configuration under the conditions specified therein.

Figure 10:
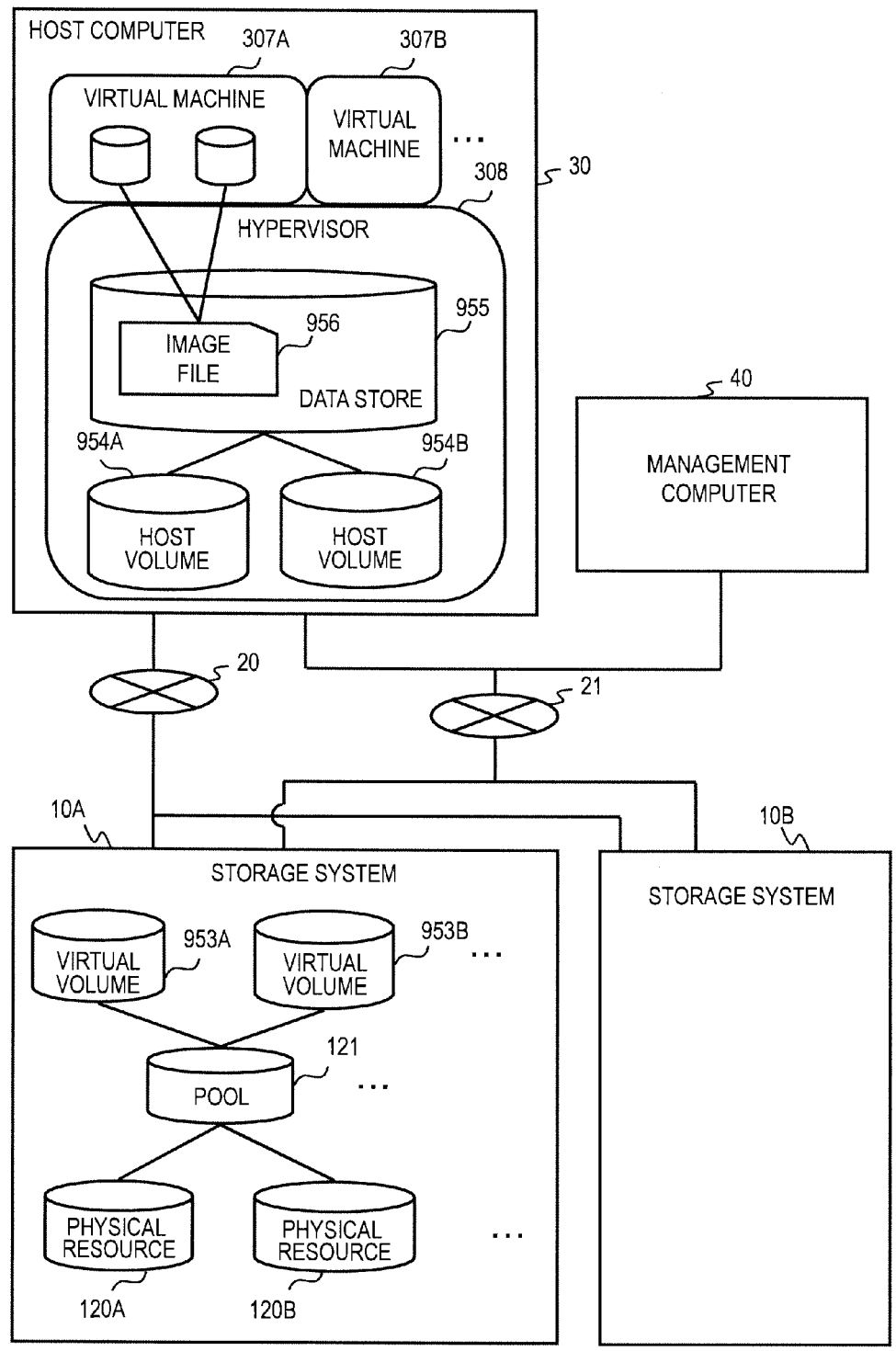
FIG. 10 is a drawing illustrating an example of the logical configuration of software and volumes in the computer system in the first embodiment.

Now with reference to a conceptual diagram of FIG. 10, the logical configuration (software configuration) of the computer system 1 in this embodiment is described. A storage system 10 provides a pool 121 including a plurality of logical volumes. The logical volumes are provided by physical resources. In the example of FIG. 10, two physical resources 120A and 120B provide the pool 121 with logical volumes. In the pool 121, each logical volume is separated into a plurality of pages.

The storage system 10 configures virtual volumes from the pool 121 and provides the host computer 30 with them. The example of FIG. 10 shows two virtual volumes 953A and 953B. The capacities of the virtual volumes 953A and 953B are virtualized, unlike those of the logical volumes. Each time a write from the host computer 30 to the virtual volume 953A or 953B creates a need of a data storage area, the storage system 10 allocates a page to the virtual volume 953A or 953B.

The storage system 10 can make the capacities of the virtual volumes 953A and 953B recognized by the host computer 30 larger than the real capacities allocated to the virtual volumes 953A and 953B (the respective total capacities of all pages) and also can make their real capacities to provide the capacities allocated to the host computer 30 smaller than the allocated capacities (dynamic provisioning). The storage system 10 may provide the host computer 30 with volumes which are each composed of pages in a pool and the real capacities thereof are equal to the capacities recognized by the host computer 30.

The hypervisor 308 in the host computer 30 recognizes the virtual volumes 953A and 953B, which are provided by a storage system 10 via the network 20, as host volumes 954A and 954B, respectively. The host volumes 954A and 954B seen from the hypervisor 308 can have larger capacities than the real capacities of the virtual volumes 953A and 953B. The storage system 10 may provide the host computer 30 (the hypervisor 308) with logical volumes (real volumes) instead of virtual volumes.

The hypervisor 308 sets up an environment to execute a plurality of VMs. This example shows VMs 307A and 307B by way of example. Moreover, the hypervisor 308 manages the host volumes 954A and 954B and regards them as a data store 955 which is a single data storage area (volume) to provide the VMs 307A and 307B with it. The hypervisor 308 may be shared by a plurality of host computers.

The substances of the VMs 307A and 307B are VM image files stored in the data store 955. FIG. 10 exemplifies a VM image file 956 for the VM 307A. Information on a VM, the guest OS operating in the VM, and application programs and data therefore are stored in one or more image files.

For example, in the example of FIG. 5, all data for the virtual machine VM001 are held in a VM image file IMG001. The data for the virtual machine VM002 are held in two VM image files IMG002 and IMG003; specifically, the contents of a drive C are held in the VM image file IMG002 and the contents of a drive D are held in the VM image file IMG003.

The hypervisor 308 manages which host volume holds what VM image file and executes a read or write for a VM image file. As described, the data store 955 is configured with the host volumes 954A and 954B as which the hypervisor 308 recognizes the virtual volumes 953A and 953B of the storage system 10. In other words, a VM image file stored in the data store 955 is stored in physical storage areas in the storage system 10.

Hereinafter, determination of a backup method in this embodiment will be described. The replication management program 406 of the management computer 40 determines candidates for the method of backing up target data and presents them to the administrator in response to a predetermined event, for example, changing of settings for a backup or new setting for a backup. Instead of presenting the candidates, the replication management program 406 selects the optimum backup method from the determined candidates for the backup method and automatically carries out setting for it.

Figure 11:
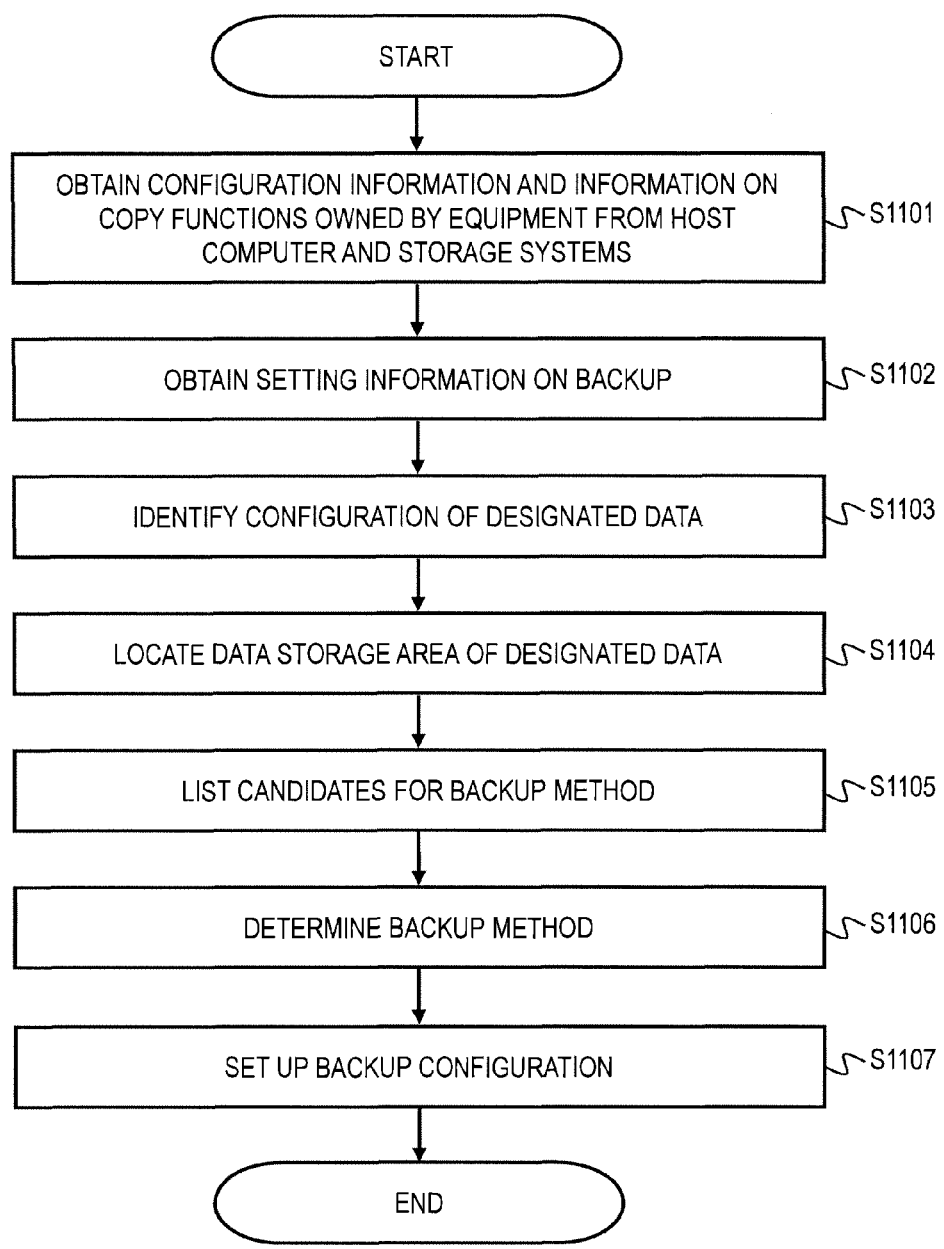
FIG. 11 is a flowchart illustrating an overall process of determining a backup method in the first embodiment.

FIG. 11 illustrates an overall process of determining a backup method. In FIG. 11, the steps from S1101 to S1105 are executed by the replication management program 406 in the management computer 40. The CPU 402 fetches the program from the memory 404 to execute this process.

The replication management program 406 obtains information on logical configuration (configuration of data in the storage) and information on the copy functions owned by each piece of equipment from the host computer 30 and the storage systems 10A and 10B (S1101). The replication management program 406 stores the obtained information in the configuration information table 407, the data storage area management table 408, and the copy function management table 409.

As shown in the configuration information table 407, the replication management program 406 obtains information on volume configuration and file configuration in the host computer 30 and the storage systems 10A and 10B for the logical configuration information. The volume configuration information includes information on relationships among host volumes recognized by the host computer 30, data stores, and virtual volumes provided by storage systems 10.

The file configuration information is configuration information on VM image files and includes information on VM image files containing logical drives of VMs and locations of storage (storage volumes) of the VM image files.

The information to be stored in the copy function management table 409 is information on the copy functions owned by each piece of equipment belonging to the computer system. Specifically, the replication management program 406 obtains information on the copy functions for backup and data relocation in the storage systems 10A and 10B, the host computer 30, and the VMs 307.

The time to obtain the information on the logical configuration and the copy functions in the system is, for example, when the administrator activates the replication management program 406. Instead, the replication management program 406 may obtain the information periodically. Otherwise, the replication management program 406 may have a function to receive information that some change has been made to the logical configuration of the system and update the information upon receipt of such information.

Next, the replication management program 406 obtains setting information for a backup (S1102). The replication management program 406 provides a window for setting a backup to start the selection of a backup method in response to the administrator's instruction.

The user interface for inputting data may be a graphical window operation (GUI: Graphical User Interface) or input of commands (CLI: Command Line Interface). The replication management program 406 may refer to a property file created by the administrator or automatically create backup settings by itself; the method of setting is not limited.

Figure 12:
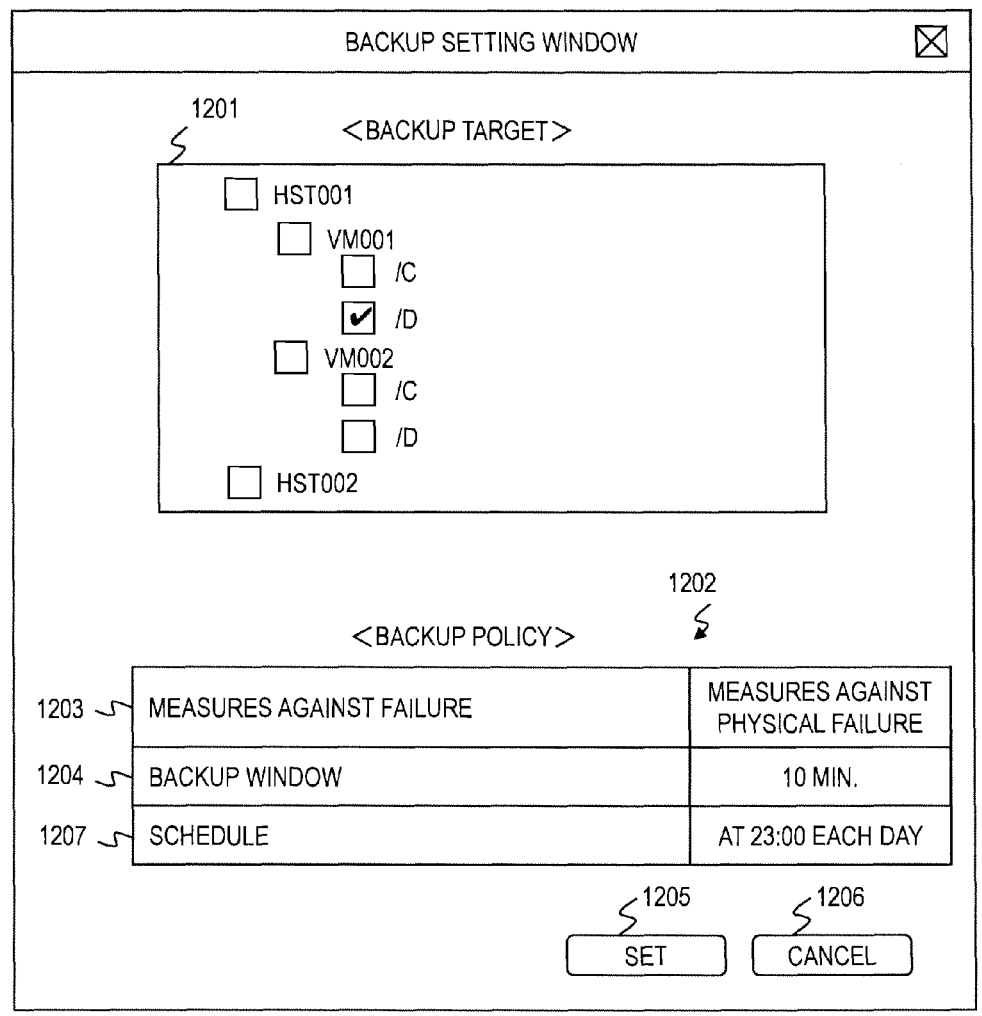
FIG. 12 is a drawing exemplifying a backup setting window in the first embodiment.

FIG. 12 exemplifies a backup setting window. The display device 401 displays this backup setting window. The backup setting window of this example includes sections for setting a backup target 1201 and for setting a backup policy 1202. The backup policy specifies conditions for backing up target data. The administrator (user) instructs the replication management program 406 to display the backup setting window for changing a backup policy (backup method) for specific data (for example, a logical drive) or setting a new backup for some data (for example, a logical drive).

The backup setting window displays the host IDs 501, the VM IDs 503, and the drive IDs 503 in the configuration information table 407 in the section of the backup target 1201. As previously described, the drive IDs 503 may be information for identifying applications using the drives, instead of the information on the drives. The data that can be designated to determine the backup method is determined by the design.

The administrator (user) can input setting information with the input device 400. Specifically, the administrator can select a data area designated to determine the backup method by clicking the relevant checkbox. In the example of FIG. 12, the drive D (/D) in the virtual machine VM001 in the host computer HOST001 is designated. The backup target 1201 is provided to designate a backup target to determine the backup method; actual backup target data may include the designated data and other data having the same backup policy as the designated data.

The administrator can set measures against failure 1203, a backup window 1204, and a schedule 1207. The information set to the schedule 1207 is the same as the schedule 804 in the backup management table 410; accordingly, the start time of the backup is set. In the measures against failure 1203, the administrator can select either one of measures against physical failure and measures against logical failure. These settings determine candidates for the copy function to be used.

The measures against physical failure are for the case where a physical damage to a volume in use causes a data loss. For example, in case of damage to a whole storage system, which is an example of the physical failure, a different remote storage system may obtain a backup data. This backup typically employs full copy to attend to the damage to a volume.

The measures against logical failure are for the case where a part of data is lost, for example, by the administrator's operation mistake. Since the volume is not damaged, it is sufficient that the data be restored to the previous one. For this reason, the storage system 10 typically employs snapshoting.

In the backup window 1204, the limit time to back up the designated data (in this example, the drive D in the virtual machine VM001) is specified. The replication management program 406 selects backup methods by which the time required for the backup will be within the specified backup window as candidates.

As will be described later, the selected candidates for the backup method may include data relocation before data copy for the backup. In such a case, the number of times of data relocations is once; in the subsequent scheduled backups, the backup method only needs to carry out data copy using a copy function of a storage system 10.

The replication management program 406 estimates the time required to use the relocation function in addition to the copy function to determine the candidates for the backup method so that the total time will fall within the value in the backup window 1204. Alternatively, it may determine the candidates for the backup method from the time required for data copy regardless of the time for the data relocation.

Upon a click of a set button 1205, the inputted settings are fixed and the replication management program 406 obtains backup setting information inputted by the administrator. Upon a click of a cancel button 1206, the replication management program 406 terminates without setting a backup.

The above-described backup policy is merely an example and backup conditions included in the backup policy depend on the design. The administrator does not need to specify a backup policy for a specific data. Data to which a backup policy is not specified can be regarded that the data have the same backup conditions as any other data in determining the backup method.

The replication management program 406 identifies the configuration of the designated data from the details specified at S1102 and the configuration information table 407 (S1103). Specifically, it finds the storage location of the designated data, namely, the file and the volume (including the data store) where the designated data is held. This information is used to examine backup methods at the subsequent S1105.

For example, like in FIG. 12, in the case where the drive D (/D) in the virtual machine VM001 in the host computer HOST001 is designated (selected) to determine the backup method, the replication management program 406 searches the column of host IDs 501 in the configuration information table 407 for HOST001, the column of VM IDs 502 for VM001, and the column of drive IDs 503 for D.

The replication management program 406 ascertains that the VM image file ID 504 for the designated HOST001-VM001-D is IMG001, the data store ID 505 is DS001, and the host volume ID 506 is HVOL001.

The replication management program 406 locates the data storage area of the data designated at S1102 from the information held in the data storage area management table 408 (S1104). For example, like at S1102, the replication management program 406 searches the column of VM/drive IDs 601 for VM001-D in accordance with the information in FIG. 12.

The replication management program 406 ascertains that the host volume ID 602 of the designated data (VM001-D) is HVOL001 and the host volume LBA area 603 is LBA3000-3999.

The replication management program 406 further refers to the data storage area management table 408 to find the association relationship between the volume and the storage area where the designated data (VM001-D) is held. As indicated by the data storage area management table 408, the virtual volume ID 606 for the designated data (VM001-D) is VVOL001 and the virtual volume LBA area 607 is LBA0000-0999.

The physical resource ID 608 and the physical resource LBA area 609 for the foregoing storage area of the virtual volume are MEDIA001 and LBA3000-3999, respectively. This means that the substance of the drive D in VM001 is held at LBA 3000-3999 in MEDIA001. The data in this storage area is the actual backup target.

In this way, the replication management program 406 can ascertain the storage area specified by the virtual volume and the LBA and the storage area specified by the physical resource and the LBA of the designated data from the data storage area management table 408.

Next, the replication management program 406 lists candidates for the backup method (S1105). The candidates for the backup method may include data relocation for changing data arrangement. The data relocation is performed only once for the subsequent periodic backups. Details of selecting the candidates for the backup method to be listed will be described later with reference to FIG. 13A to FIG. 13D. The replication management program 406 determines the definitive backup method to be used from the candidates for the backup method (S1106).

One of the determination methods allows the administrator to select the backup method to be used from the candidates listed at S1105. In this case, the replication management program 406 creates a window for presenting the candidates for the backup method and displays them with the display device 401. The user interface may be either of a GUI and a CLI and the display method is not limited.

Figure 14:
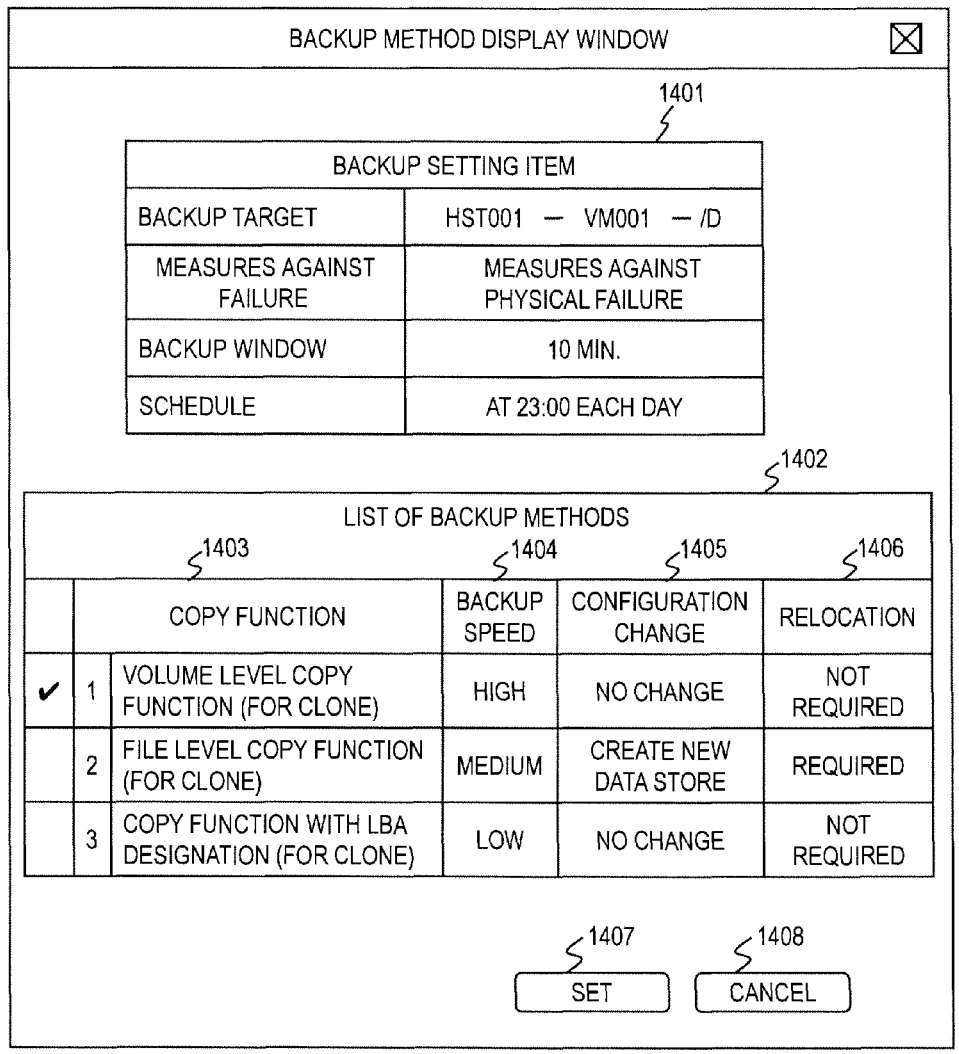
FIG. 14 is a drawing exemplifying a backup method display window in the first embodiment.

For example, the replication management program 406 obtains necessary information through a backup method display window as shown in FIG. 14. In FIG. 14, the backup method display window includes sections of backup setting items 1401 and a list of backup methods 1402. The backup setting items 1401 display details set by the administrator in the backup setting window (FIG. 12), for example.

The list of backup methods 1402 displays the candidates for the backup method listed at S1105. The administrator clicks a checkbox to select the backup method to be used. In the example of FIG. 14, the list of backup methods 1402 shows information on copy functions 1403, backup speed 1404, configuration change 1405, and relocation 1406.

The configuration change 1405 indicates whether the adoption of a particular backup method causes a change in the volume configuration or the file configuration. The relocation 1406 indicates whether the adoption of the backup method creates a need of data relocation. Details of these will be described later with reference to FIG. 13A to FIG. 13D.

The replication management program 406 can obtain information to be indicated in the backup speed 1404 from the copy function management table 409, for example. The copy function management table 409 has a not-shown column of copy performance; the replication management program 406 shows the information held in the column in the backup speed 1404.

In this way, the list of backup methods 1402 provides the administrator with supplemental information to determine the backup method. Upon a click of a set button 1407, the inputted settings are fixed. Instead, upon a click of a cancel button 1408, the processing terminates without selecting a backup method to be applied.

In another method of selecting a backup method to be applied to the system from the candidates therefore, the replication management program 406 selects the backup method in accordance with the information in the system policy table 411 (FIG. 9). If the backup method is uniquely determined at S1105, that is, if the candidate for the backup method is only one, this step can be skipped.

Finally, the replication management program 406 sets up a backup configuration to implement the backup method determined at S1106 (S1107). The replication management program 406 executes this step, for example, when the replication management program 406 receives an instruction to set up a backup configuration from the administrator or in the case where automatic setup of a backup configuration is predetermined by a policy.

Specifically, the replication management program 406 performs settings of a storage system 10 and the host computer 30 required for data relocation to back up the designated data and for backup of the target data. The replication management program 406 does not need to execute this step. A storage controller 11 carries out a backup in accordance with the setting data.

Hereinafter, details of the determining a backup candidate at S1105 in the flowchart of FIG. 11 will be described with reference to the flowcharts of FIG. 13A to FIG. 13D. As described above, the replication management program 406 operates in accordance with these flowcharts. First, the replication management program 406 examines the storage condition of designated data (data designated as a backup target for determining a backup method) in accordance with the flowchart of FIG. 13A and categorizes the designated data by the storage condition.

Specifically, the replication management program 406 ascertains the location of the designated data (in the example of FIG. 12, HST001-VM001-/D), or the file and the volume storing the data, and further, data configuration of the volume holding the data, specifically, other data in the volume and the file holding the designated data. In particular, it identifies the backup policy of the other data. The replication management program 406 categorizes the designated data depending on the ascertained storage condition of the designated data.

The function required to copy only the backup target including the designated data is different depending on the storage condition of the designated data. In other words, the storage condition of the designated data determines the copy function of a storage system 10 to be used for backup. Moreover, changing data arrangement (data storage condition) by relocating data (designated data or other data) increases the number of copy functions in the storage system 10 that can be used for backup.

It is preferable that the computer system 1 perform backup using a copy function of a storage system 10 without using a copy function of the host computer 30 to suppress the load on the host computer 30. It is more preferable that only the target data be backed up without data relocation. This is to eliminate increase in load on the host computer 30 caused by the data relocation and increase in management load caused by the change in the volume configuration.

Figure 13A:
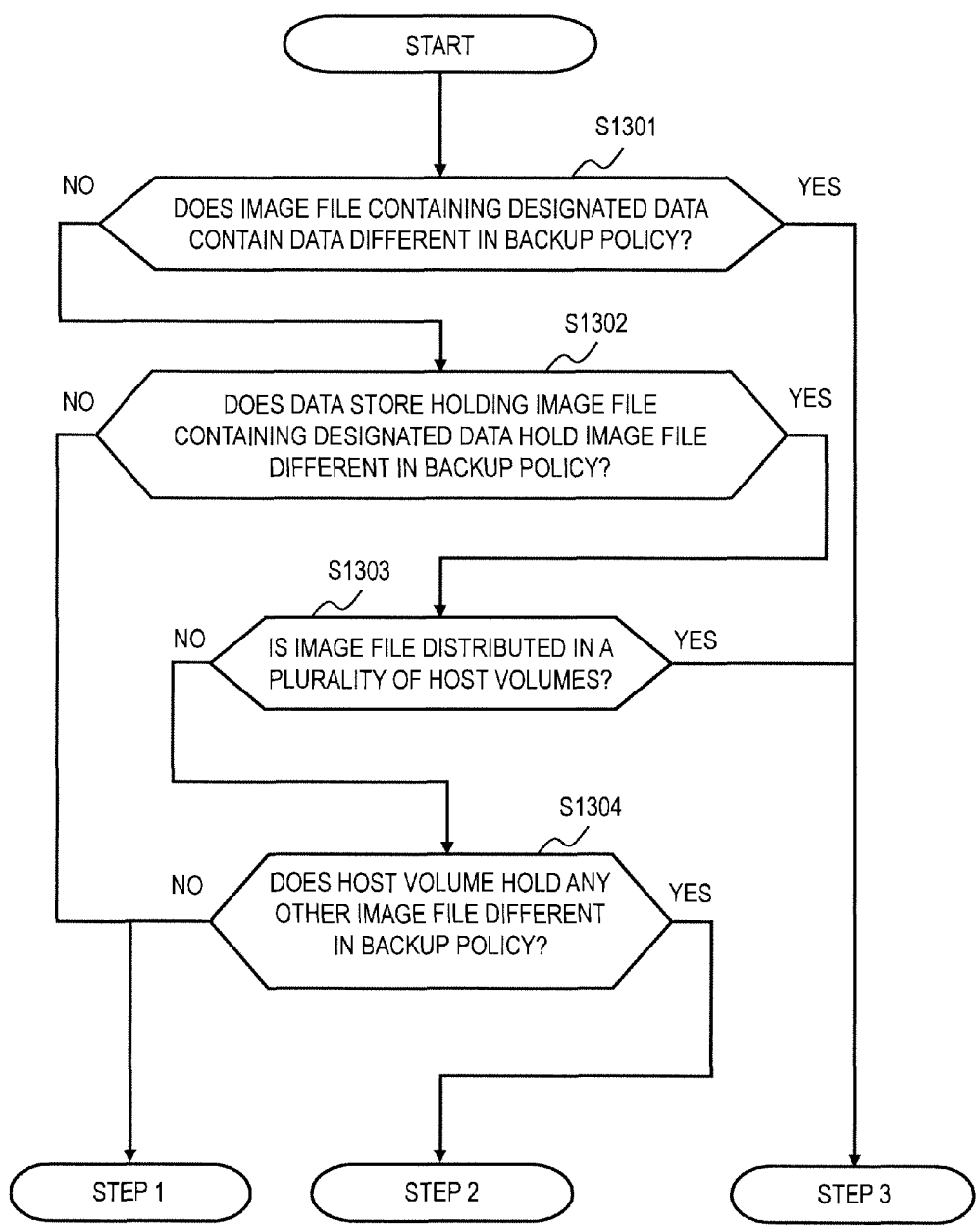
FIG. 13A is a flowchart illustrating an example of a process to examining the storage condition of target data to determine candidates for the backup method in the first embodiment.

The replication management program 406 therefore follow the flowchart of FIG. 13A to categorize the designated data depending on the unit of copy operation (granularity of copy operation) required for the storage system 10 to perform a backup using the copy function in the storage system 10 without data relocation.

In the example described below, the replication management program 406 determines a candidate for the backup method depending on whether the storage system 10 has a volume level copy function, a file level copy function, and a block level copy function. A block is a unit of data access in the storage system 10.

The check for the copy function by the replication management program 406 is based on the copy functions that can be implemented in the storage system 10. The replication management program 406 may check for all of the foregoing three functions or for not all of them. The replication management program 406 may check whether the storage system 10 has a page level copy function as well as copy functions in other units to determine the copy function of the storage system to be used for backup and the necessity of data relocation for the backup method based on the result of the check.

In the flowchart of FIG. 13A, the replication management program 406 first determines whether the VM image file containing the designated data contains data different in the backup policy from the designated data (S1301). The data under the same backup policy can be copied in the same backup. Accordingly, the data under the backup policy same as the one for the designated data can be included in the target data of the same backup.

If the result of the determination at S1301 is NO, the replication management program 406 proceeds to S1302. If the result of the determination at S1301 is YES, the replication management program 406 proceeds to Step 3 (the flowchart of FIG. 13D). The data categorized into Step 3 needs a block level copy function under a current data arrangement. Details of Step 3 will be described later.

If a VM image file contains data different in the backup policy from the designated data, copying the VM image file to back up the designated data using a volume level copy function or a file level copy function creates a copy of data unnecessary for the backup. Hence, a function that can copy a part of the VM image file is required.

As explained at S1105 in the flowchart of FIG. 11, the replication management program 406 can find the VM image file containing the designated data and the data contained in the VM image file with reference to the configuration information table 407.

For example, in the case where the value of VM image file ID 504 located at S1103 is IMG001, the replication management program 406 searches the column of VM image file IDs 504 for a VM ID 502 or a drive ID 503 sharing the IMG001. The example of FIG. 5 shows that drive C in VM001 shares IMG001.

The replication management program 406 refers to the system policy table 411 to ascertain the backup policy of the drive C in VM001. If the backup policy of this data is different from the backup conditions for the drive D of the designated data, the result of the determination at S1301 is YES.

Next, at S1302, the replication management program 406 determines whether the data store holding the VM image file containing the designated data holds a VM image file different in the backup policy from the designated data. At S1302, the VM image file containing the designated data is configured with the designated data only or the designated data and data under the same backup policy as the designated data.

Figure 13B:
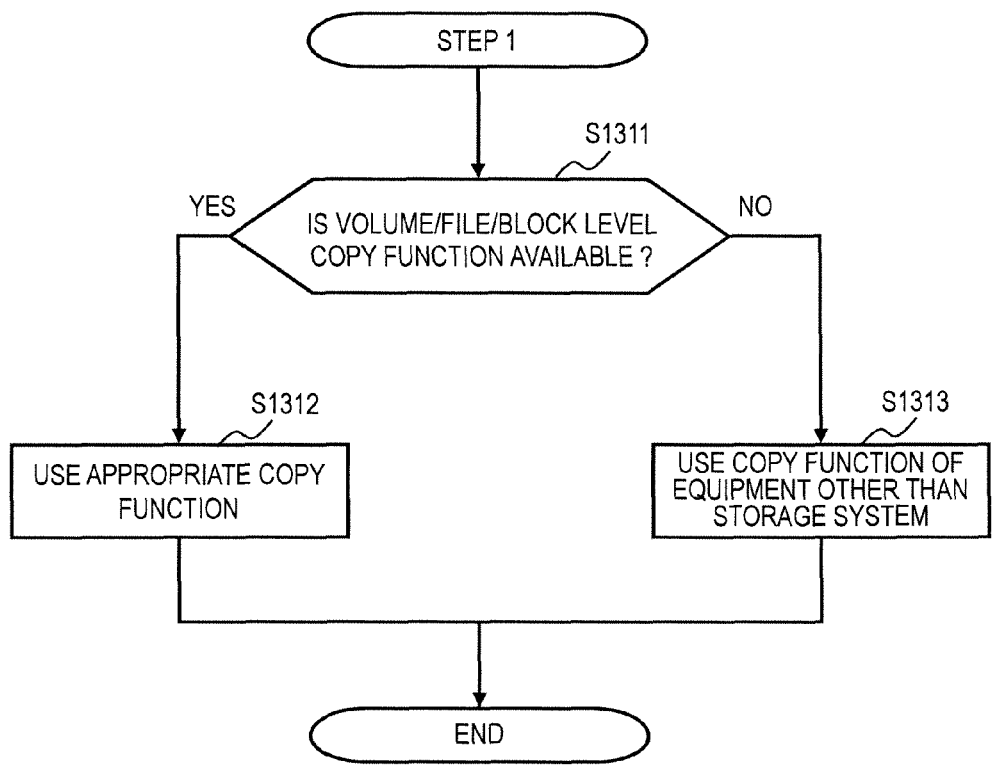
FIG. 13B is a flowchart illustrating an example of a process to determine candidates for the backup method depending on the storage condition of the target data in the first embodiment.

If the result of the determination at S1302 is YES, the replication management program 406 proceeds to S1303. If the result of the determination at S1302 is NO, the replication management program 406 proceeds to Step 1 (FIG. 13B). The data categorized into Step 1 require the storage system 10 to have a copy function in the granularity of a volume or smaller than that under the current data arrangement. Details of Step 1 will be described later.

If the result of the determination at S1302 is NO, all data (VM image files) in the data store have the same backup policy. Hence, copying all the volumes that constitute the data store by the storage system 10 leads to backing up necessary data only (backup target data only).

The replication management program 406 can identify the data store containing the designated data and the configuration of the data store with reference to the configuration information table 407. For example, in the case where the VM image file ID 504 located at S1303 is IMG001, the data store ID 505 of the data store holding the VM image file IMG001 is DS001. Furthermore, the replication management program 406 refers to the system policy table 411 to ascertain the backup policy of the data contained in the data store ID 505.

The replication management program 406 searches the column of data store IDs 505 to check whether any VM image file other than IMG001 is held in the data store DS001. In the example of FIG. 5, the data store DS001 holds the VM image file IMG001 only. That is to say, the result of the determination at S1302 is NO.

Next, at S1303, the replication management program 406 determines whether the VM image file containing the designated data is distributed in a plurality of host volumes. If the result of the determination at S1303 is NO, the replication management program 406 proceeds to S1304. If the result of the determination at S1303 is YES, a block level copy function is required to back up the distributed data; accordingly, the replication management program 406 proceeds to Step 3.

The conditions to reach S1303 are a case where a VM image file contains only the designated data or a case where a VM image file contains data under the same backup policy, and in addition, a case where the data store containing this image file holds another image file different in backup policy.

At S1303, the replication management program 406 determines whether the VM image file is distributed in a plurality of host volumes in an environment where a plurality of host volumes are allocated to the data store. For example, in the example of the configuration information table 407 of FIG. 5, the data in the VM image file IMG002 is distributed in the host volumes HVOL002 and HVOL003. Accordingly, the result of the determination at S1303 is YES.

Next, at S1304, the replication management program 406 determines whether the host volume holding the VM image file containing the designated data holds another VM image file different in the backup policy from the designated data. At S1304, the VM image file containing the designated data is held in a volume (NO at S1303). In addition, the VM image file contains the designated data only or the designated data and data under the same backup policy only.

If the result of the determination at S1304 is NO, the replication management program 406 proceeds to Step 1. If the result of the determination at S1304 is NO, the VM image file of the backup target is held in a single host volume, and the host volume holds VM image files under the same backup policy only or does not hold any other VM image file. Accordingly, the volume level copy function can copy VM image files only.

If the result of the determination at S1304 is YES, the replication management program 406 proceeds to Step 2. If the result of the determination at S1304 is YES, the VM image file containing the designated data is held in a single host volume and further, the host volume holding the VM image file holds another VM image file different in backup policy. Since a file level copy function can copy the VM image file containing the designated data only, the replication management program 406 proceeds to Step 2.

The replication management program 406 refers to the configuration information table 407 to check whether the entry of the host volume ID 506 holds a plurality of VM image file IDs 504. In the example of FIG. 5, the host volume H-VOL001 holds the VM image file IMG001 only. In this case, the result of the determination at S1304 is NO.

Figure 13C:
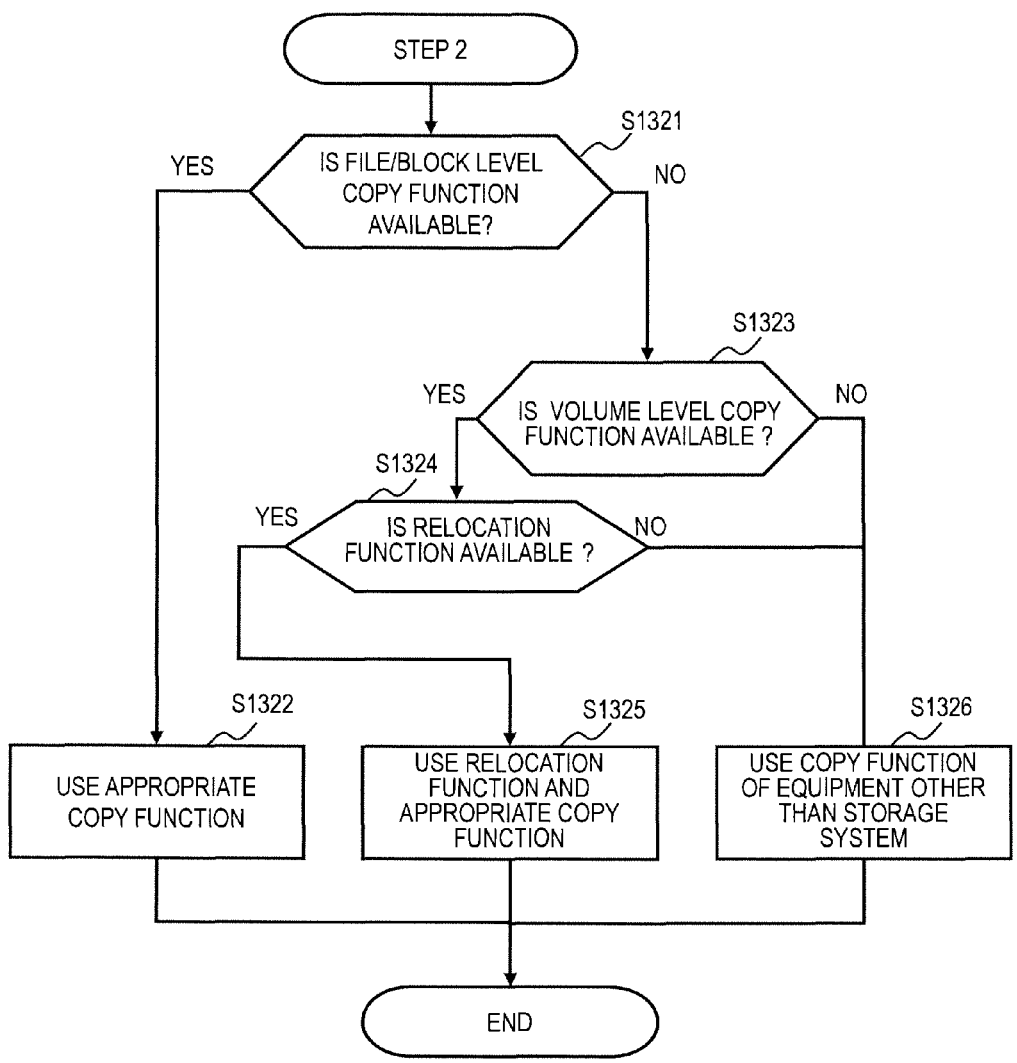
FIG. 13C is a flowchart illustrating an example of a process to determine candidates for the backup method depending on the storage condition of the target data in the first embodiment.
Figure 13D:
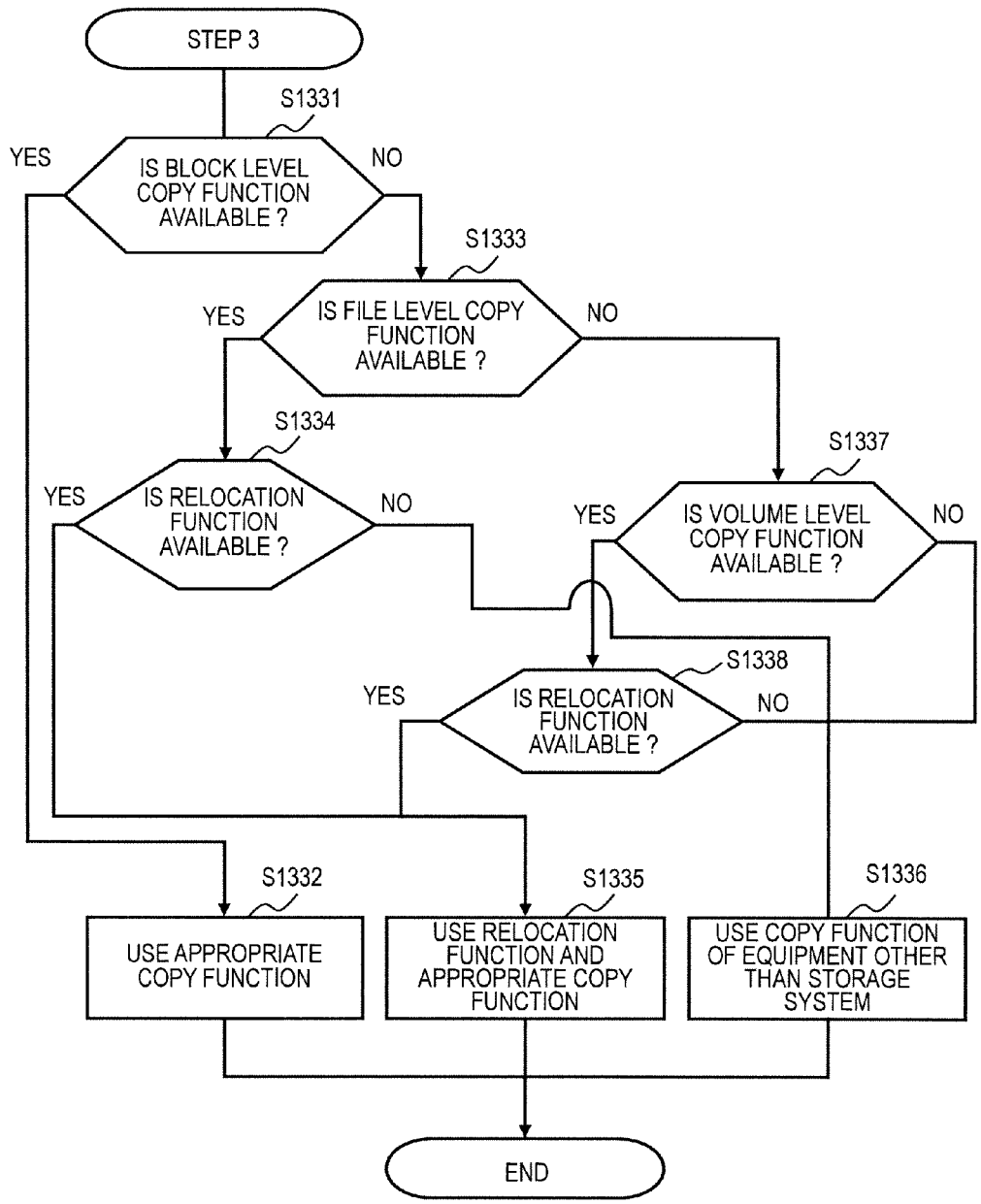
FIG. 13D is a flowchart illustrating an example of a process to determine candidates for the backup method depending on the storage condition of the target data in the first embodiment.

Hereinafter, the details of Step 1, Step 2, and Step 3 shown in FIG. 13A will be described with reference to FIG. 13B, FIG. 13C, and FIG. 13D, respectively. First, with reference to FIG. 13B, Step 1 will be described. Step 1 determines candidates for the backup method in the case where the designated data is contained in one or more host volumes (virtual volumes) and the data in the volumes have the same backup policy. In this case, the storage system 10 can satisfy backup requirements with copy functions in the granularity of a volume or smaller than that.

At S1311, the replication management program 406 refers to the copy function management table 409 to check whether the storage system 10 to be operated has any of a volume level copy function (copy function with volume designation), a file level copy function (copy function with file designation), and a block level copy function (copy function with LBA designation).

If the storage system 10 has any one of the copy functions, the replication management program 406 proceeds to S1312. Any of the copy functions can copy the data in need to be backed up (backup target data) only. In other words, the copy operation to back up the designated data can eliminate data different in backup policy from the designated data. If the storage system 10 does not have any copy function in any unit, the replication management program 406 proceeds to S1313.

For example, the replication management program 406 can ascertain that the storage system ST002 has a volume level copy function (for clone) with reference to the copy function management table 409. In this case, the result of the determination at S1311 is YES and the replication management program 406 proceeds to S1312.

At S1312, the replication management program 406 determines one or more candidates for the backup method using the foregoing copy functions and stores the information indicating the candidates for the backup method in the memory 404. The replication management program 406 may create a new file for storing the information on candidates for the backup method.

If the storage system 10 does not have any copy function in any units (NO at S1311), the replication management program 406 determines a backup method that uses a copy function except for the ones of the storage system 10 (S1313). Specifically, in the case where entries of VMs or host computers in the copy function management table 409 show copy functions for backup use, the replication management program 406 presents the administrator backup methods using these copy functions.

For example, in the example of FIG. 7, the host computer HOST001 (the hypervisor running thereon) has a VM snapshot function that can be used for backup. The replication management program 406 presents a backup method candidate using this copy function to the administrator. The replication management program 406 does not need to execute this step.

Next, with reference to FIG. 13C, details of Step 2 will be described. Step 2 determines candidates for the backup method in the case where the VM image file of the designated data is held in a single host volume (virtual volume) but the virtual volume holds data under a different backup policy, or data which is not included in the target for backing up the designated data.

First, at S1321, the replication management program 406 searches the column of system equipment IDs 702 in the copy function management table 409 for an ID of the storage system 10 to be operated and determines whether the storage system 10 has a file level copy function or a block level copy function.

If the storage system 10 has either one of the copy functions (YES at S1321), the replication management program 406 proceeds to S1322. If the storage system 10 have neither one of the copy functions (NO at S1321), the replication management program 406 proceeds to S1323.

For example, in the copy function management table 409 of FIG. 7, the storage system ST002 has a volume level copy function (for clone) only, and does not have a file level or block level copy function. In this case, the result of the determination at S1321 is NO and the replication management program 406 proceeds to S1323. In the meanwhile, the storage system ST001 has file level copy functions and block level copy functions; the replication management program 406 proceeds to S1322.

At S1322, the replication management program 406 determines that the backup method using the copy functions found at S1321 to be candidates for the backup method for actual use. Specifically, the replication management program 406 stores information indicating the candidates for the backup method in the memory 404. The replication management program 406 may create a new file for storing the foregoing information. Data relocation is not necessary to use these backup methods.

If the storage system 10 does not have a file level copy function or a block level copy function (NO at S1321), the replication management program 406 determines whether the storage system 10 has a volume level copy function with reference to the copy function management table 409 at S1323.

If the storage system 10 has a volume level copy function (YES at S1323), the replication management program 406 proceeds to S1324. If the storage system 10 does not have a volume level copy function (NO at S1323), the replication management program 406 proceeds to S1326.

For example, in the copy function management table 409 of FIG. 7, the storage system ST002 has a volume level copy function (for clone). If the storage system that performs copy for backup is the storage system ST002, the result of the determination at S1323 is YES, so that the replication management program 406 proceeds to S1324.

At S1324, the replication management program 406 determines whether the host computer 30 has a data relocation function to perform backup that satisfies requirements by using a volume level copy function. If the host computer 30 has such a function to relocate VM image files (YES at S1324), the replication management program 406 proceeds to S1325. If it does not have a relocation function (NO at S1324), the replication management program 406 proceeds to S1326.

The replication management program 406 searches the copy function management table 409 for copy functions 703 for use of relocation 705. In an environment where this step is skipped, data under different backup policies are mixed in the subject data store. Moreover, a host volume included in the data store, or a virtual volume (a primary volume), holds image files under different backup policies.

Accordingly, if the host computer 30 can relocate VM image files from a host volume to host volume, the storage system 10 can copy the designated data (and data under the same backup policy) only using its volume level copy function. These host volumes may be located in the same data store or different data stores.

In the copy function management table 409 of FIG. 7, three data relocation functions are registered: the first one is the data copy function of a VM (guest OS), the second one is the in-data-store image file rearrangement function of a host computer (hypervisor), and the last one is the data-store-to-data-store image file relocation function of a host computer (hypervisor).

The data copy function of a VM can relocate a VM image file or a part of the data in the VM image file to the same host volume or a different host volume. Specifically, the data copy function of a VM creates a new VM image file containing the copy data in the same or the different host volume.

The in-data-store image file rearrangement function of the host computer 30 (hypervisor) relocates a VM image file from a host volume to host volume included in the same data store. This function allows data to be rearranged so that data different in backup policy are not mixed in the same volume.

The data-store-to-data-store image file relocation function of the host computer 30 (hypervisor) relocates a VM image file in a volume to a volume in another data store. This function needs a data store other than the subject data store. The host computer 30 newly creates a data store or relocates the intended VM image file to another data store having the same backup policy.

Any one of the foregoing three relocation functions can relocate a VM image file from a host volume to host volume. Accordingly, as long as the storage system 10 has any one of the three relocation functions, a volume level copy function in the storage system 10 can back up the target data as requested after data relocation using the relocation function.

At S1325, the replication management program 406 determines one or more candidates for the backup method that uses a relocation function and a volume level copy function and stores information indicating the candidates for the backup method in the memory 404. The replication management program 406 may create a new file for storing the information on candidates for the backup method. As described above, the one or more relocation functions that can be employed are determined at S1324.

If the storage system 10 does not have a copy function in any unit (neither NO at S1321 nor NO at S1323), the replication management program 406 determines a backup method that uses a copy function except for the ones of the storage system 10 (S1326). S1326 is the same as S1313.

If the storage system 10 has a desired copy function (for example, YES at S1321), the flow does not examine backup methods using other copy functions with relocation. Like in the example of FIG. 14, however, the replication management program 406 may determine a candidate for the backup method with relocation (S1325) even if a candidate for the backup method without relocation is provided. The same applies to the process following the flowchart of FIG. 13D, which will be described below.

Next, with reference to FIG. 13D, details of Step 3 will be described. Step 3 determines candidates for the backup method in the case where the designated data is contained in a VM image file together with other data different in backup policy (YES at S1301), or a data store holds VM image files different in backup policy (YES at S1302) and further, the VM image file containing the designated data is distributed in a plurality of host volumes (YES at S1303).

At S1331, the replication management program 406 determines whether the storage system 10 to be operated has a block level copy function with reference to the copy function management table 409. If it has a block level copy function (YES at S1331), the replication management program 406 proceeds to S1332. If it does not have a block level copy function (NO at S1331), the replication management program 406 proceeds to S1333.

For example, in the example of the copy function management table 409 of FIG. 7, the storage system ST001 has block level copy functions. Accordingly, if the storage system ST001 is the object for operation, the result of the determination at S1331 is YES and the replication management program 406 proceeds to S1332.

Next, at S1332, the replication management program 406 determines candidates for the backup method that use the relevant copy functions (block level copy functions) and stores information indicating the candidates for the backup method in the memory 404. The replication management program 406 may create a new file for storing the information on the candidates for the backup method. Data relocation is not necessary to use these backup methods.

At S1333, the replication management program 406 determines whether the storage system 10 to be operated has a file level copy function with reference to the copy function management table 409. If it has a file level copy function (YES at S1333), the replication management program 406 proceeds to S1334. If it does not have a file level copy function (NO at S1333), the replication management program 406 proceeds to S1337.

Next, at S1334, the replication management program 406 determines whether the host computer 30 has a relocation function to perform the backup using the file level copy function. If the host computer 30 has a relevant relocation function (YES at S1334), the replication management program 406 proceeds to S1335. If it does not have such a relocation function (NO at S1334), the replication management program 406 proceeds to S1336.

Specifically, the replication management program 406 searches the copy function management table 409 for a copy function 703 whose use is relocation 705. In an environment where this step is skipped, the VM image file of the target includes designated data and data different in backup policy from the designated data, or the designated data are distributed in a plurality of volumes. Hence, a file level relocation function and a file level copy function cannot be used.

To achieve backup using a file level copy function, a function to relocate a part of the data in a VM image file to a different VM image file is necessary. The data copy function of a VM can relocate designated data or data other than the designated data to a different VM image file on the guest OS. This operation enables the VM file containing the designated data not to contain data different in backup policy together.

To use this function, another VM image file is necessary in addition to the target VM image file. The VM image file may be newly created. Alternatively, if a VM has a VM image file under the same backup policy, data may be relocated to the VM image file.

At S1335, the replication management program 406 determines candidates for the backup method that use relevant relocation functions and copy functions (file level or volume level copy functions) and stores the information indicating the candidates for the backup method in the memory 404. The replication management program 406 may newly create a file for storing the information on the candidates for the backup method. At S1336, the replication management program 406 determines a backup method that uses a copy function except for the ones of the storage system 10. This step is the same as S1313.

At S1337, the replication management program 406 determines whether the storage system 10 to be operated has a volume level copy function with reference to the copy function management table 409. If the storage system 10 has a volume level copy function (YES at S1337), the replication management program 406 proceeds to S1338. If the storage system 10 does not have a volume level copy function (NO at S1337), the replication management program 406 proceeds to S1336.

At S1338, the replication management program 406 determines whether a relocation function to perform backup using a volume level copy function is available. If such a relocation function is available, the replication management program 406 proceeds to S1335. If such a relocation function is not available, the replication management program 406 proceeds to S1336. The determination method at S1338 is the same as the one at S1334.

Second Embodiment

A second embodiment is described. The second embodiment is applied when the logical configuration of the computer system 1 in the first embodiment is altered, for example, when a VM is newly created. The second embodiment recommends a new logical configuration (including volume configuration and data arrangement) depending on the unit of copy operation of the copy function in the storage system. Obtaining a backup policy at new creation of a VM leads to setting up a logical configuration suitable for the backup environment. The new VM may be created by creating a new image file or copying an existing VM image file.

Figure 15:
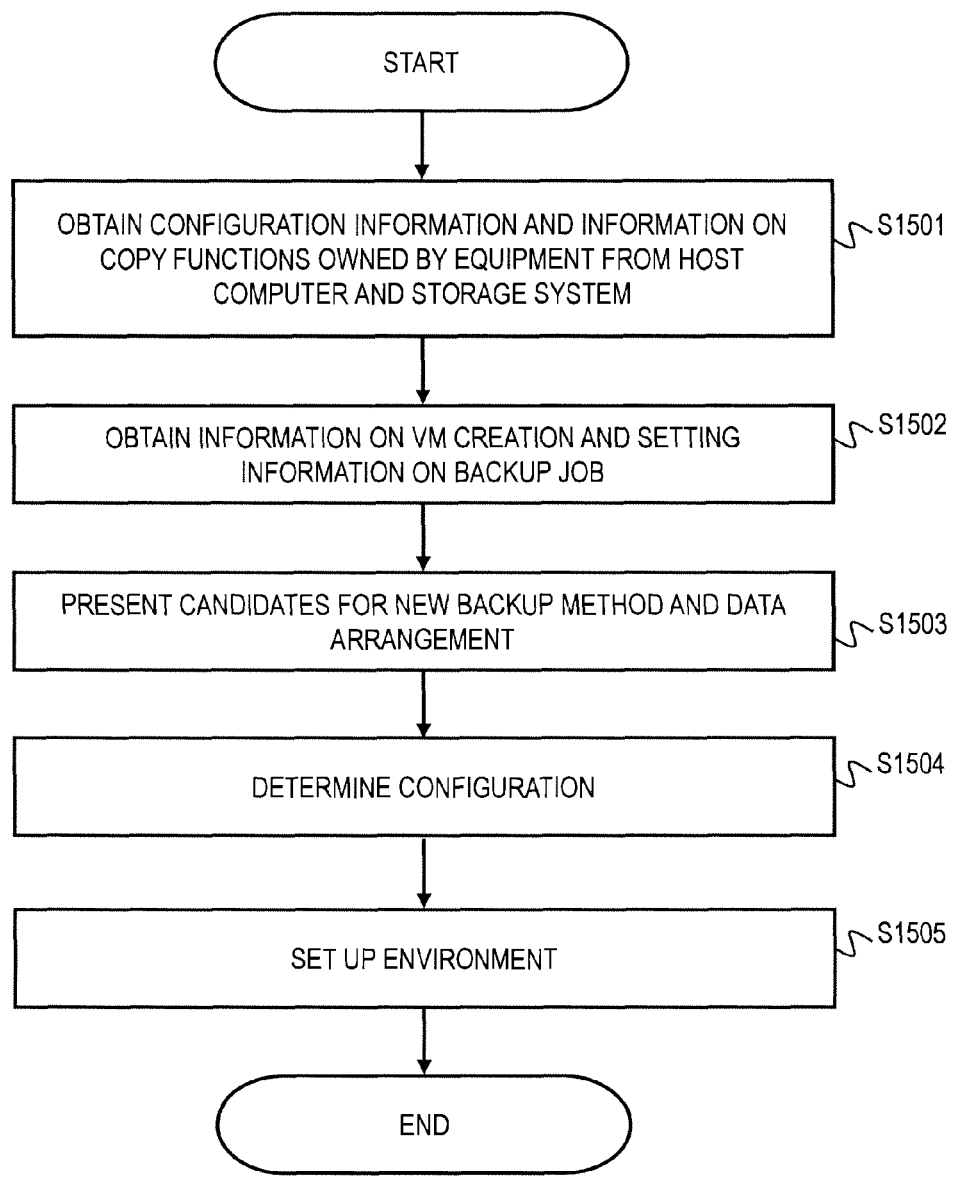
FIG. 15 is a flowchart illustrating an example of a process to determine the backup method in the second embodiment.

The system configuration and information to be used in this embodiment are the same as those described with reference to FIG. 1 to FIG. 10 in the first embodiment. Next, determination of backup and configuring an environment therefore in this embodiment will be described with reference to FIG. 15. At S1501, the replication management program 406 obtains information on the logical configuration and copy functions owned by each piece of equipment from the host computer 30 and the storage systems 10. This step is the same as S1101.

At S1502, the replication management program 406 obtains information on creation of a VM and settings for backup. The information on creation of a VM includes configuration information on data (designated data) of the VM to be created, for example, information on logical drive configuration (information indicating what logical drives are included in the VM). In the case of creating a new VM by reallocating a VM image file, the logical configuration of the VM is the same as the one before the reallocation.

The replication management program 406 obtains the setting information for backup in the same way as at S1102. The information on creation of a VM is sent by the agent 309 to the replication management program 406 when the hypervisor 308 creates the VM. The replication management program 406 may obtain the information on creation of a VM in cooperation with the hypervisor 308.

These operations are performed in response to the administrator's instruction to start processing of the replication management program 406 through windows for creating a new VM and for obtaining a backup policy provided thereby. The user interface may be window operations with GUI or command inputs with CLI. The replication management program 406 may use a property file created by the administrator or automatically create a VM. The setting method is not limited.

At S1503, the replication management program 406 presents candidates for a new backup method and a data arrangement in the VM to use the backup method. The data configuration determines the configuration of volumes and files for storing the data of the VM; specifically, it determines the one or more VM image files to be added and one or more volumes to store the VM image files.

The replication management program 406 determines candidates for the backup method and the data arrangement from the information on the copy functions of the storage system 10 and the creation of a VM. For example, if a VM includes data different in backup policy and the storage system 10 has copy functions with volume designation only, the replication management program 406 proposes storing the data in separate virtual volumes. This proposal enables the storage system 10 to perform backup using a copy function of the storage system 10 only.

Specifically, the replication management program 406 checks whether the VM includes data different in backup policy from the setting information on new creation of a VM and setting information for backup obtained at S1502. Next, the replication management program 406 ascertains the copy functions available in the storage system 10 from the copy function management table 409.

If the VM contains data different in backup policy and the storage system 10 has only copy functions with volume designation, it is necessary to store the data different in backup policy in separate virtual volumes. This is because copy in units of virtual volume allows writes of data areas under the same backup policy only to the same virtual volume.

For this reason, it is necessary to store data different in backup policy in different volumes. Otherwise (in the case where the backup policies of all data are the same), even if one or more VM image files are stored in the same virtual volume, backup using a copy function of the storage system 10 can be performed because of no limitation to the data arrangement.

If the storage system 10 has a file level copy function, it is enough if VM image files to be added be configured with data under the same backup policy and be held in a volume. If the storage system 10 has a block level copy function, the data configuration of the VM to be added may be any one.

At S1504, the replication management program 406 determines the backup method to be used and the data configuration of the VM to be added suitable for the backup method. For example, the replication management program 406 allows the administrator to select a backup method from the candidates listed at S1503. In this case, the replication management program 406 provides a window for presenting the candidates for the backup method. The display method is not limited. If the configuration is uniquely identified, this process can be skipped.

At S1505, the replication management program 406 sets up an environment determined at S1504. Specifically, the replication management program 406 provides the settings for the backup method determined at S1503 to the storage system 10. Moreover, the replication management program 406 instructs the hypervisor 308 to set up the data configuration determined at S1504. Through these operations, the environment determined at S1504 can be configured.

As set forth above, preferred embodiments of this invention have been described, but this invention is not limited to the above-described embodiments. Those skilled in the art can easily modify, add, or convert each constituent in the above embodiments within the scope of this invention. A part of the configuration of one embodiment may be replaced with the one of the other embodiment; and the configuration of one embodiment may be added to the other embodiment. A part of the configuration of each embodiment may be added, deleted, or replaced by a different configuration.

The above-described configurations, functions, processors, and means for processing, for all or a part of them, may be implemented by hardware: for example, by designing integrated circuits. The information of programs, tables, and files to implement the functions may be stored in a storage device such as a non-volatile semiconductor memory, a hard disk drive, or an SSD (Solid State Drive), or a computer-readable non-transitory data storage medium such as an IC card, an SD card, or a DVD.

What is claimed is:

1. A storage management system comprising a storage system, a host computer and a management computer;
   wherein the storage system comprises a storage device and provides a virtual volume to the host computer;
   wherein the host computer runs a virtual machine, provides a logical drive which is a unit of backup by the virtual machine, provides an image file which comprises the logical drive, provides a data store which comprises the image file, and provides a host volume which configures the data store and is recognized as the virtual volume;
   wherein the management computer stores:
      a copy function management information which includes an identifier (ID) of devices in the storage management system; and
      a configuration information which includes an ID of the virtual volume, the virtual machine, the logical drive, the data store, the image file and the host volume; and
   configures to determine a way of backup based on a relationship among the image file, the data store, the host volume and a target data of backup by referring to the copy function management information and the configuration information.

2. The storage management system according to claim 1, wherein the host volume corresponds to the virtual volume on a one-to-one basis.

3. The storage management system according to claim 2, wherein the management computer furthermore stores a backup policy information which includes an ID of the target data of backup and a backup policy; and
   wherein the determination is furthermore based on a difference of backup policy between the target data of backup and the other potential target data of backup which exists in the image file or the data store same as the target data of backup.

4. The storage management system according to claim 3, wherein the management computer narrows down a candidate of the way of backup by a unit of the copy function when determining the way of backup.

5. The storage management system according to claim 3, wherein the management computer narrows down a candidate of the way of back up by whether or not the copy function can cooperate other function which includes a migration function, when determining the way of backup.

6. The storage management system according to claim 5, wherein the backup policy includes backup window indicating a time limit for backup, and
   wherein the management computer furthermore narrows down a candidate of the way of back up by whether or not the copy function and the other function cooperated with the copy function can complete within the time limit, when determining the way of backup.

7. The storage management system according to claim 3, wherein the copy function management information furthermore includes a priority order, and
   wherein the management computer narrows down a candidate of the way of backup by the priority order, when determining the way of backup.

8. A management computer coupled to a storage system and a host computer,
   wherein the storage system comprises a storage device and provides a virtual volume to the host computer;
   wherein the host computer runs a virtual machine, provides a logical drive which is a unit of backup by the virtual machine, provides an image file which comprises the logical drive, provides a data store which comprises the image file, and provides a host volume which configures the data store and is recognized as the virtual volume;
   the management computer stores:
      a copy function management information which includes an identifier (ID) of devices in the storage management system; and
      a configuration information which includes an ID of the virtual volume, the virtual machine, the logical drive, the data store, the image file and the host volume; and
   configures to determine a way of backup based on a relationship among the image file, the data store, the host volume and a target data of backup by referring to the copy function management information and the configuration information.

9. The management computer according to claim 8, wherein the host volume corresponds to the virtual volume on a one-to-one basis.

10. The management computer according to claim 9, wherein the management computer furthermore stores a backup policy information which includes an ID of the target data of backup and a backup policy; and
    wherein the determination if furthermore based on a difference of backup policy between the target data of backup and the other potential target data of backup which exists in the image file or the data store same as the target data of backup.

11. The management computer according to claim 10, wherein the management computer narrows down a candidate of the way of backup by a unit of the copy function when determining the way of backup.

12. The management computer according to claim 10, wherein the management computer narrows down a candidate of the way of back up by whether or not the copy function can cooperate other function which includes a migration function, when determining the way of backup.

13. The management computer according to claim 12, wherein the backup policy includes backup window indicating a time limit for backup, and
    wherein the management computer furthermore narrows down a candidate of the way of back up by whether or not the copy function and the other function cooperated with the copy function can complete within the time limit, when determining the way of backup.

14. The management computer according to claim 10, wherein the copy function management information furthermore includes a priority order, and
    wherein the management computer narrows down a candidate of the way of backup by the priority order, when determining the way of backup.

15. A method for determining a way of backup in a storage management system including a storage system, a host computer and a management computer,
    wherein the storage system comprises a storage device and provides a virtual volume to the host computer;
    wherein the host computer runs a virtual machine, provides a logical drive which is a unit of backup by the virtual machine, provides an image file which comprises the logical drive, provides a data store which comprises the image file, and provides a host volume which configures the data store and is recognized as the virtual volume; and
    wherein the management computer stores a copy function management information which includes an identifier (ID) of devices in the storage management system and a configuration information which includes an ID of the virtual volume, the virtual machine, the logical drive, the data store, the image file and the host volume;

the method comprising a step of determining a way of backup based on a relationship among the image file, the data store, the host volume and a target data of backup by referring to the copy function management information and the configuration information.

16. The method for determining a way of backup according to claim 15, wherein the host volume corresponds to the virtual volume on a one-to-tone basis.

17. The method for determining a way of backup according to claim 16, wherein the management computer furthermore stores a backup policy information which includes an ID of the target data of backup and a backup policy; and wherein the determination is furthermore based on a difference of backup policy between the target data of backup and the other potential target data of backup which exists in the image file or the data store same as the target data of backup.

18. The method for determining a way of backup according to claim 17, furthermore comprising the step of narrowing down a candidate of the way of backup by a unit of the copy function when determining the way of backup.

19. The method for determining a way of backup according to claim 17, furthermore comprising the step of narrowing down a candidate of the way of backup by whether or not the copy function can cooperate other function which includes a migration function, when determining the way of backup.

20. The method for determining a way of backup according to claim 17, wherein the copy function management information furthermore includes a priority order, and the method furthermore comprising a step of narrowing down a candidate of the way of backup by the priority order, when determining the way of backup.

* * * * *